United States Patent
Chopra et al.

(10) Patent No.: US 12,198,311 B2
(45) Date of Patent: Jan. 14, 2025

(54) METHOD AND ELECTRONIC DEVICE FOR MANAGING ARTIFACTS OF IMAGE

(71) Applicant: SAMSUNG ELECTRONICS CO., LTD., Suwon-si (KR)

(72) Inventors: Ashish Chopra, Noida (IN); Bhanu Mahto, Madhubani Purnea (IN); Sumit Kumar, Benares (IN); Vinay Sangwan, Jhunjhunu (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/543,912

(22) Filed: Dec. 7, 2021

(65) Prior Publication Data

US 2022/0188991 A1 Jun. 16, 2022

Related U.S. Application Data

(63) Continuation of application No. PCT/KR2021/017284, filed on Nov. 23, 2021.

(30) Foreign Application Priority Data

Dec. 12, 2020 (IN) .............................. 202041054122

(51) Int. Cl.
*G06N 3/045* (2023.01)
*G06T 5/50* (2006.01)
(Continued)

(52) U.S. Cl.
CPC .............. *G06T 5/80* (2024.01); *G06N 3/045* (2023.01); *G06T 5/50* (2013.01); *G06V 10/25* (2022.01);
(Continued)

(58) Field of Classification Search
CPC . G06T 2207/20084; G06T 2207/10024; G06T 5/20; G06T 5/50; G06T 7/11;
(Continued)

(56) References Cited

U.S. PATENT DOCUMENTS

| | | | |
|---|---|---|---|
| 7,742,650 B2 * | 6/2010 | Xu ..................... | G06V 30/153 382/265 |
| 8,358,691 B1 * | 1/2013 | Wang ..................... | G06T 7/20 382/199 |

(Continued)

FOREIGN PATENT DOCUMENTS

| | | | | |
|---|---|---|---|---|
| CN | 109754440 A | | 5/2019 | |
| CN | 110443763 A | * | 11/2019 | ............. G06T 5/001 |
| CN | 111652822 B | * | 3/2023 | ............. G06T 5/005 |

OTHER PUBLICATIONS

Ma, L.-Q., Wang, J., Shechtman, E., Sunkavalli, K. and Hu, S.-M. (2016), Appearance Harmonization for Single Image Shadow Removal. Computer Graphics Forum, 35: 189-197. https://doi.org/10.1111/cgf.13016 (Year: 2016).*

(Continued)

*Primary Examiner* — Chan S Park
*Assistant Examiner* — Woo C Rhim
(74) *Attorney, Agent, or Firm* — Sughrue Mion, PLLC

(57) ABSTRACT

A method and an electronic device for managing artifacts of an image includes: receiving an input image and extracting multiple features from the input image. The multiple features include a texture of the input image, a color composition of the input image and edges in the input image. Further, the method includes determining a region of interest (RoI) in the input image including an artifact based on the features and generating an intermediate output image by removing the artifact using multiple generative adversarial networks (GANs). Further, the method includes generating a binary mask using the intermediate output image, the input (Continued)

image, an image illustrating edges in the input image and an image illustrating edges in the intermediate output image and obtaining a final output image by applying the generated binary mask to the input image.

19 Claims, 35 Drawing Sheets

(51) Int. Cl.
  *G06T 5/80* (2024.01)
  *G06V 10/25* (2022.01)
  *G06V 10/44* (2022.01)
  *G06V 10/56* (2022.01)
  *G06V 10/82* (2022.01)

(52) U.S. Cl.
  CPC .............. *G06V 10/44* (2022.01); *G06V 10/56* (2022.01); *G06V 10/82* (2022.01); *G06T 2207/20084* (2013.01)

(58) Field of Classification Search
  CPC ... G06T 2207/10016; G06T 5/00; G06T 5/94; G06T 2207/20012; G06T 7/0002; G06T 7/90; G06T 11/001; G06T 2207/30168; G06T 2207/20192; G06T 7/13; G06T 5/80; G06T 2200/24; G06T 2207/20081; G06T 2207/30201; G06N 3/045; G06N 3/084; G06N 20/20; G06N 3/04; G06N 3/094; G06N 3/02; G06N 3/044; G06N 3/088; G06V 10/82; G06V 10/764; G06V 10/25; G06V 30/413; G06V 10/26; G06V 10/44; G06V 10/56; G06V 10/446; G06V 10/30; G06V 10/993
  See application file for complete search history.

(56) References Cited

U.S. PATENT DOCUMENTS

| | | | | |
|---|---|---|---|---|
| 9,430,715 | B1* | 8/2016 | Wang | G06T 5/94 |
| 10,262,236 | B2* | 4/2019 | Lim | G06F 18/28 |
| 10,719,742 | B2* | 7/2020 | Shechtman | G06N 3/088 |
| 10,817,990 | B1* | 10/2020 | Yang | G06T 3/4053 |
| 2006/0082849 | A1* | 4/2006 | Kaku | G06V 10/273 |
| | | | | 358/537 |
| 2010/0046804 | A1* | 2/2010 | Gu | H04N 19/86 |
| | | | | 382/190 |
| 2011/0206282 | A1* | 8/2011 | Aisaka | G06T 11/60 |
| | | | | 382/195 |
| 2012/0008019 | A1* | 1/2012 | Zhang | G06V 10/273 |
| | | | | 348/E9.037 |
| 2012/0148103 | A1* | 6/2012 | Hampel | G06T 7/254 |
| | | | | 382/103 |
| 2012/0242675 | A1* | 9/2012 | Zimmer | G06V 40/193 |
| | | | | 345/589 |
| 2014/0254938 | A1* | 9/2014 | Gu | H04N 19/14 |
| | | | | 382/199 |
| 2017/0289405 | A1* | 10/2017 | Agrawal | G06T 5/90 |
| 2018/0260991 | A1* | 9/2018 | Sarma | G06T 5/00 |
| 2019/0266706 | A1* | 8/2019 | Mondal | G06T 7/136 |
| 2019/0325621 | A1* | 10/2019 | Wang | G06N 3/045 |
| 2019/0333218 | A1* | 10/2019 | Bronkalla | G06T 7/0014 |
| 2019/0333219 | A1* | 10/2019 | Xu | G06T 11/008 |
| 2020/0372351 | A1* | 11/2020 | Chang | G06V 10/764 |
| 2020/0372694 | A1* | 11/2020 | Hwang | G06T 11/40 |
| 2021/0082092 | A1* | 3/2021 | Sargent | G06T 5/50 |
| 2021/0224565 | A1* | 7/2021 | Lin | G06V 30/19173 |
| 2021/0357688 | A1* | 11/2021 | Kearney | G06F 18/214 |
| 2021/0358171 | A1* | 11/2021 | Syed | G06T 7/194 |
| 2022/0067994 | A1* | 3/2022 | Neuberger | G06F 18/214 |
| 2022/0122308 | A1* | 4/2022 | Kalarot | G06T 3/4046 |
| 2022/0245769 | A1* | 8/2022 | Galeotti | G06T 7/12 |

OTHER PUBLICATIONS

Le, Quang H. et al., "GAN Mask R-CNN: Instance semantic segmentation benefits from generativeadversarial networks", arXiv.cs.arXiv:2010.13757v1, pp. 1-12, Oct. 26, 2020. (13 pages total).
Gu, Ke et al., "Learning a No-Reference Quality Assessment Model of Enhanced Images With Big Data", arxiv.org/pdf/1904.08632v1, pp. 1-12, Apr. 18, 2019. (13 pages total).
International Search Report (PCT/ISA/210) and Written Opinion (PCT/ISA/237) issued Feb. 25, 2022 by the International Searching Authority in counterpart International Patent Application No. PCT/KR2021/017284.
Communication dated Jul. 12, 2022 issued by the Indian Patent Office in counterpart Indian Application No. 202041054122.
Gronmeyer et al., "An Overview of Optical Character Recognition (OCR) Technology and Techniques", Naval Ocean Research And Development Activity, Jun. 1978, 93 pages total.
Communication dated Jan. 3, 2024, issued by the European Patent Office in counterpart European Application No. 21903689.4.
Khan et al., "Automatic Shadow Detection and Removal from a Single Image," IEEE Transactions on Pattern Analysis and Machine Intelligence, vol. 38, No. 3, Mar. 2016, Total 16 pages, XP011597574.
Wang et al., "Shadow Removal Based on the Luminance, Texture and Color-Ratio of the Pix," IEEE International Conference on Information and Automation (ICIA), Aug. 2013, Total 5 pages, XP032558920.
Ye et al., "Single Image Glare Removal Using Deep Convolutional Networks," IEEE International Conference on Image Processing (ICIP), Oct. 2020, Total 5 pages, XP033869439.
Communication dated Dec. 15, 2023, issued by the India Intellectual Property Office in Indian Patent Application No. 202041054122.

* cited by examiner

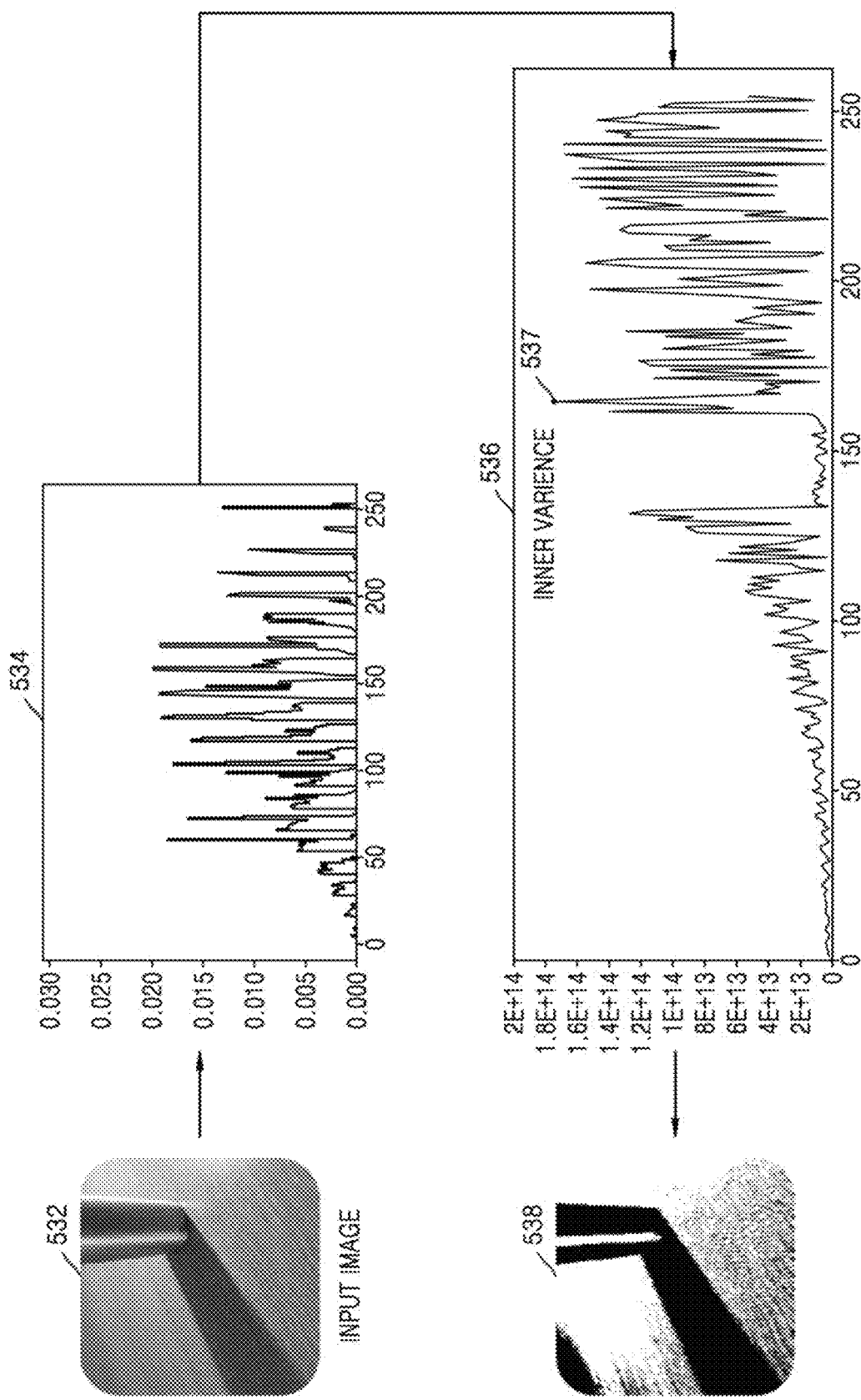

(a)

(b)

WANTED ARTIFACT (c)

(d)

UNWANTED ARTIFACT

FIG. 8C

| Gamma | NIQE |
|---|---|
| 0 | 26.731686 |
| 0.25 | 12.636731 |
| 0.5 | 16.227692 |
| 0.75 | 17.11933 |
| 1 | 17.876227 — A |
| 1.25 | 16.412139 |
| 1.5 | 15.54887 — D |
| 1.75 | 14.224213 |
| 2 | 12.960259 |
| 2.25 | 12.315888 |
| 2.5 | 12.263988 |
| 2.75 | 12.148762 |
| 3 | 11.912211 |
| 3.25 | 12.027273 |
| 3.5 | 11.818377 |
| 3.75 | 11.860986 |
| 4 | 11.823454 |
| 4.25 | 12.189983 |
| 4.5 | 12.244774 |
| 4.75 | 12.462192 |
| 5 | 12.655649 — C |
| 5.25 | 12.632329 |
| 5.5 | 12.476416 |
| ... | ... |
| 10 | 17.26 — B |

With Shadow

Without Shadow

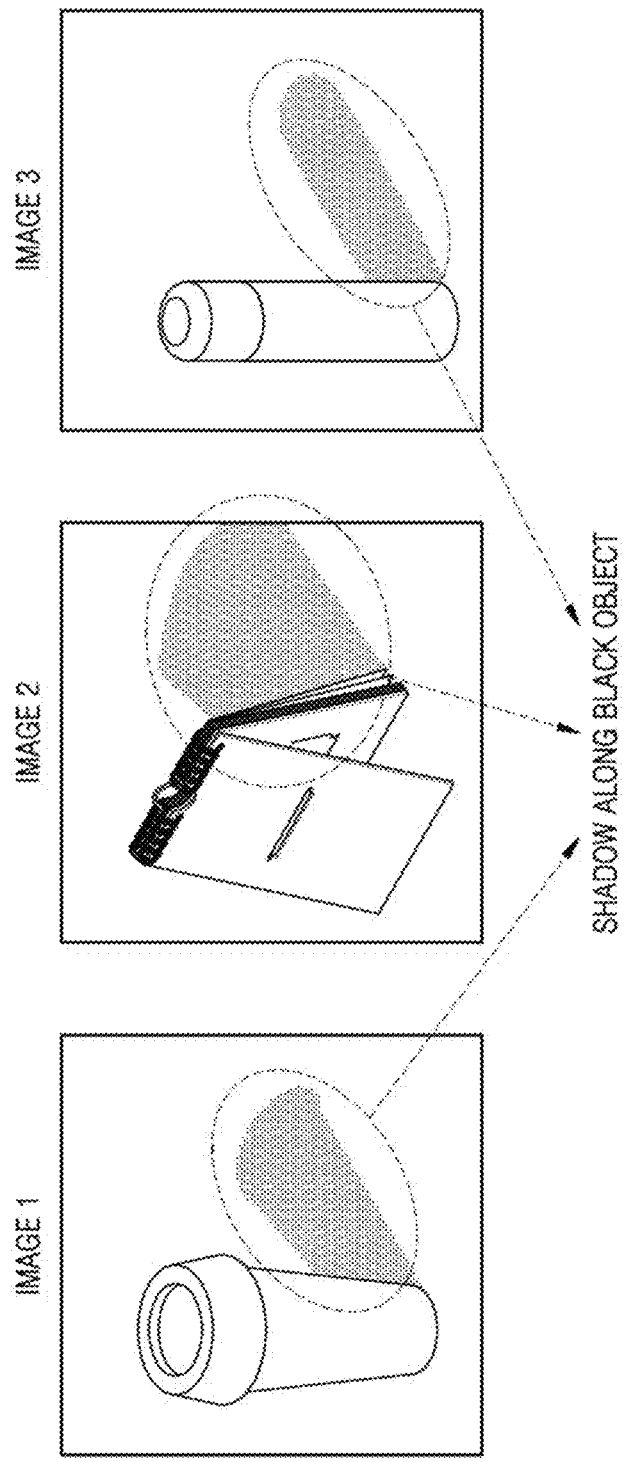

METHOD AND ELECTRONIC DEVICE FOR MANAGING ARTIFACTS OF IMAGE

CROSS-REFERENCE TO RELATED APPLICATION(S)

This application is a by-pass continuation of International Application No. PCT/KR2021/017284, filed on Nov. 23, 2021, which based on and claims priority to Indian Complete Patent Application No. 202041054122, filed on Dec. 12, 2020, the disclosures of which are incorporated by reference herein in their entireties.

FIELD

The present disclosure relates to electronic devices, and more particularly to a method and an electronic device for managing artifacts of an image.

BACKGROUND

In general, cameras in electronic devices provide various options for editing an image. However, while capturing the image, various artifacts such as shadow, glare, exposure and color inconsistencies may be added to the image. The various artifacts added to the image may degrade user experience and also quality of the image. For example, as shown in FIG. 1, the artifact such as a shadow may block texture details captured in a photograph 102, may create unnecessary patterns on a face of human subject captured in a photograph 104 and may make it difficult to recognize characters in optical character recognition (OCR) when the artifacts appear on the characters as shown in a photograph 106. If the artifact is a glare then the artifact may add unnecessary patterns to a photograph 108 and may hinder visibility of a subject captured in the photograph 108. Also, there is no single method by which the various artifacts can be managed effectively.

Existing solutions to managing the artifacts require multiple instances of user intervention. For example, the user may be required to select an extent to which the artifact needs to be removed by using a shadow slider which changes contrast of images as shown in FIG. 2, but the feature of the shadow slider does not effectively eliminate the shadow. Artifact such as glare in the image is not simply removed by changing contrast of the image.

OBJECT

The principal object of the embodiments herein is to provide a method and an electronic device for managing artifacts of an image. The method according to embodiment requires minimum or no manual intervention from a user other than a user's selection of an artifact managing icon in the electronic device. Also, the method is not restricted to any particular artifact type and can be used to manage all forms of the artifact such as shadow, glare, etc.

Another object of the embodiments herein is to use multiple generative adversarial networks (GAN) and classify the artifact or a portion of the artifact into wanted artifact and unwanted artifact. Therefore, the artifact or the portion of the artifact which is classified as wanted is retained in an output image and the artifact or the portion of the artifact which is classified as unwanted is removed from the output image. As a result, the method and the electronic device according to embodiments may not completely remove the artifact, and rather may intelligently determine whether the artifact or a portion of the artifact enhances image details and may retain the artifact or the portion of the artifact.

SUMMARY

According to an aspect of the disclosure, a method for processing image data, may include: receiving an input image; extracting a plurality of features from the input image, wherein the plurality of features may include a texture of the input image, a color composition of the input image, and edges in the input image; determining at least one region of interest (RoI) in the input image including at least one artifact based on the plurality of features; generating at least one intermediate output image by removing the at least one artifact from the input image, using a plurality of generative adversarial networks (GANs); generating a binary mask using the at least one intermediate output image, the input image, the edges in the input image, and edges in the at least one intermediate output image; categorizing the at least one artifact into a first artifact category or a second artifact category, based on the binary mask to the input image; and obtaining a final output image by processing the input image based on a category of the at least one artifact corresponding to the first artifact category or the second artifact category.

The first artifact category may correspond to a wanted artifact, and the second artifact category may correspond to an unwanted artifact.

The method may further include: generating a plurality of versions of the at least one intermediate output image by varying a gamma value associated with the final output image; determining a naturalness image quality evaluator (NIQE) value for each of the plurality of versions of the at least one intermediate output image; and displaying, as the final output image, one of the plurality of versions of the at least one intermediate output image, which has a least NIQE value, among the NIQE values for the plurality of versions of the at least one intermediate output image.

The extracting the plurality of features from the input image may include: extracting the texture, the color composition, and the edges from the input image based on Otsu thresholding, Gaussian Blur and edge detection, respectively.

The plurality of GANs may include a negative generator, an artifact generator, a division generator, a negative discriminator, a division discriminator, a refinement generator and a refinement discriminator.

The generating the at least one intermediate output image may include: determining a set of loss values for each of the plurality of GANs; generating a first GAN image using the negative generator by removing darkest regions of the at least one artifact in the input image; generating a second GAN image using the artifact generator by removing at least one of color continuous regions and texture continuous regions of the at least one artifact in the input image; generating a third GAN image using the division generator by removing lightest regions of the at least one artifact and adding white patch regions to the at least one artifact in the input image; and generating the at least one intermediate output image without the at least one artifact using at least one of the first GAN image, the second GAN image and the third GAN image.

The input image may be a previous input image, and the method may further include: receiving a new input image; and overlaying the binary mask obtained for the previous input image on the new input image.

The at least one artifact may be a shadow or a glare.

According to another aspect of the disclosure, an electronic device for processing image data, may include: a memory storing instructions; and a processor configured to execute the instructions to: receive an input image; extract a plurality of features from the input image, wherein the plurality of features may include a texture of the input image, a color composition of the input image and edges in the input image; determine a region of interest (RoI) in the input image including at least one artifact based on the plurality of features; generate an at least one intermediate output image by removing the at least one artifact from the input image using a plurality of generative adversarial networks (GANs); generate a binary mask using the at least one intermediate output image, the input image, the edges in the input image and edges in the at least one intermediate output image; categorize the at least one artifact into a wanted artifact or an unwanted artifact, based on the binary mask; and obtain a final output image from the input image based on a category of the at least one artifact that corresponds to the wanted artifact or the unwanted artifact.

The processor may be further configured to: generate a plurality of versions of the at least one intermediate output image by varying a gamma value associated with the final output image; determine a naturalness image quality evaluator (NIQE) value for each of the plurality of versions of the at least one intermediate output image; and display a version of the final output image with a least NIQE value, among the NIQE values for the plurality of versions.

The processor may be further configured to: extract the texture, the color composition, and the edges based on Otsu thresholding, Gaussian Blur, and edge detection, respectively.

The plurality of GANs may include a negative generator, an artifact generator, a division generator, a negative discriminator, a division discriminator, a refinement generator, and a refinement discriminator.

The processor may be further configured to: determine a set of loss values for each of the plurality of GANs; generate a first GAN image using the negative generator by removing darkest regions of the at least one artifact in the input image; generate a second GAN image using the artifact generator by removing at least one of color continuous regions and texture continuous regions of the at least one artifact in the input image; generate a third GAN image using the division generator by removing lightest regions of the at least one artifact and adding white patch regions to the at least one artifact in the input image; and generate the at least one intermediate output image without the at least one artifact using at least one of the first GAN image, the second GAN image and the third GAN image.

The input image may be a previous input image, and the processor may be further configured to: receive a new input image; and overlay the binary mask obtained for the previous input image on the new input image.

The at least one artifact may be a shadow or a glare.

According to another aspect of the disclosure, a non-transitory computer-readable storage medium storing a program that is executable by one or more processors is provided to perform a method of processing image data. The method may include: obtaining an input image; identifying types of artifacts included in the input image; generating a plurality of intermediate output images in which the artifacts are processed differently according to the types of artifacts; generating a binary mask based on the plurality of intermediate output images and the input image; and applying the binary mask to the input image to selectively keep or remove the artifacts and to obtain a final output image in which at least one of the artifacts remains and another at least one of the artifacts is removed.

The types of artifacts may include a darkest region of a shadow in the input image, a continuous color and texture region of the shadow, and a lightest region of the shadow. The generating the plurality of intermediate output images may include: removing the darkest region of the shadow from the input image to generate a first intermediate output image; removing the continuous color and texture region of the shadow from the input image to generate a second intermediate output image; and removing the lightest region of the shadow from the input image to generate a third intermediate output image.

The removing the lightest region of the shadow to generate the third intermediate output image may include: adding a white patch to the lightest region of the shadow after removing the lightest region of the shadow.

The method may further include combining the first intermediate output image, the second intermediate output image, and the third intermediate output image, as a combined intermediate image of the plurality of intermediate output images. The generating the binary mask may include generating the binary mask based on the combined intermediate image.

BRIEF DESCRIPTION OF FIGURES

The above and/or other aspects will be more apparent by describing certain example embodiments, with reference to the accompanying drawings, in which:

FIG. 5C is an example illustrating extraction of texture of the input image using Otsu thresholding by the electronic device, according to embodiments as disclosed herein;

FIG. 8C is a table illustrating NIQE against Gamma for obtaining various images by varying the gamma value, according to the embodiments as disclosed herein;

FIG. 10A is an example illustrating a scenario of shadow along a black background, according to the prior art;

DETAILED DESCRIPTION

Figure 1:
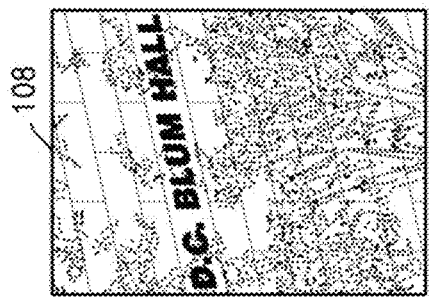
FIG. 1 illustrates example images including artifacts, according to a prior art.
Figure 1:
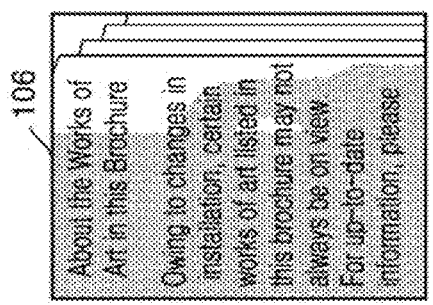
Figure 1:
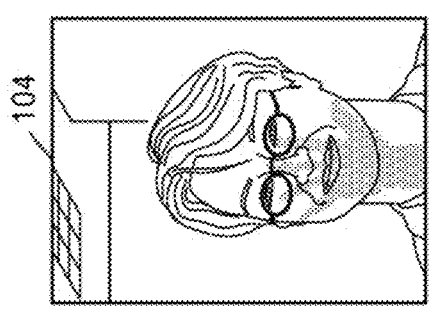
Figure 1:
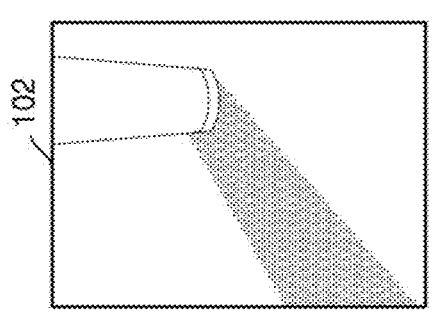
Figure 2:
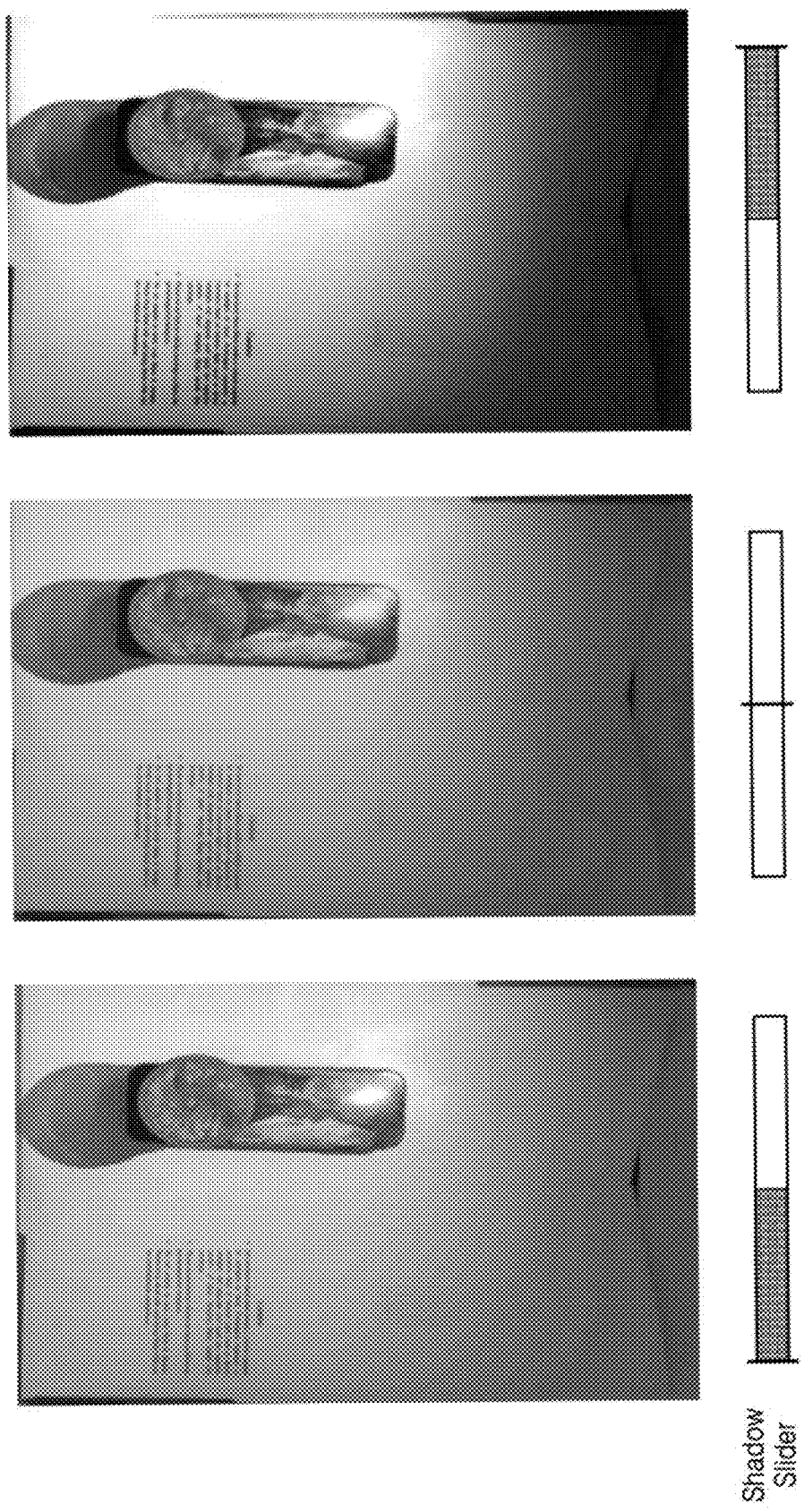
FIG. 2 illustrates an example scenario of removing a shadow from an image, according to a prior art.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail. The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

The term "or" as used herein, refers to a non-exclusive or, unless otherwise indicated. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. The term "image(s)" as used herein, refer to one or more images. For example, "image(s)" may indicate one image or a plurality images.

Embodiments in the present disclosure may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although the terms first, second, etc. may be used herein to describe various elements, these elements should not be limited by these terms. These terms are generally only used to distinguish one element from another.

Accordingly the embodiments herein disclose a method for and an electronic device for managing artifact of an image. The method includes receiving an input image and extracting multiple features from the input image. The features include a texture of the input image, a color composition of the input image and edges in the input image. Further, the method includes determining a region of interest (RoI) in the input image including an artifact based on the features and generating an intermediate output image by removing the artifact using multiple GAN. The artifact may be either a shadow or a glare. Further, the method includes generating a binary mask using the intermediate output image, the input image, an image illustrating edges in the input image and an image illustrating edges in the intermediate output image and obtaining a final output image by applying the generated binary mask to the input image.

In the related art, an electronic device allows a user to edit an input image to remove a shadow. However, the efficacy of the shadow removal is not high and hence degrades the quality of the image. Further, there have been no method and system which address all forms of artifacts such as shadow, glare, etc. The related method and system focus more on allowing the user to correct exposure and edit the images by varying contrast or color composition to remove or lighten the artifacts.

Unlike the related method and system, the electronic device according to embodiments uses multiple GANs to generate a binary mask which defines the portion of the artifact as wanted and unwanted. Further, the binary mask is overlaid on the input image to remove or retain the artifact or the portion of the artifact. Therefore, the electronic device according to embodiments intelligently manages the artifact in the input image.

Figure 3:
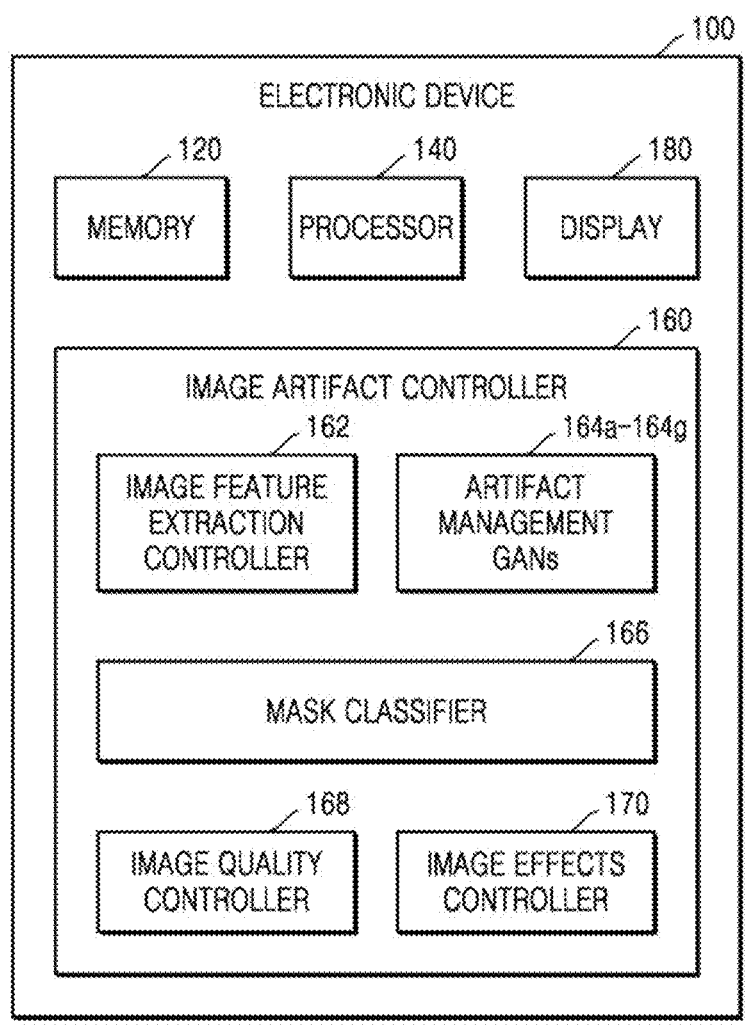
FIG. 3 is a block diagram of an electronic device for managing artifacts of an image, according to embodiments as disclosed herein.

FIG. 3 is a block diagram of an electronic device 100 for managing artifact of an image, according to embodiments.

Referring to FIG. 3, the electronic device 100 may be but is not limited to a laptop, a palmtop, a desktop, a mobile phone, a smart phone, Personal Digital Assistant (PDA), a tablet, a wearable device, an Internet of Things (IoT) device, a virtual reality device and an immersive system. In an embodiment, the electronic device 100 includes a memory 120, a processor 140, an image artifact controller 160 and a display 180.

The memory 120 is configured to store binary mask(s) generated using intermediate output image(s), input image (s), an image illustrating edges in the input image(s) and an image illustrating edges in the intermediate output image(s). The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In certain examples, a non-transitory storage medium may store data that can, over time, change (e.g., in Random Access Memory (RAM) or cache).

The processor 140 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU), an AI accelerator, or a machine learning accelerator. The processor 140 may include multiple cores and is configured to execute the instructions stored in the memory 120.

In an embodiment, the image artifact controller 160 includes an image feature extraction controller 162, an artifact management generative adversarial networks (GANs) 164a-164g, a mask classifier 166, an image quality controller 168 and an image effects controller 170. Although FIG. 3 illustrates the image artifact controller 160 as an element that is separate or different from the processor 140, the image artifact controller 160 may be incorporated into the processor 140, or may be embodied as another processor.

The image feature extraction controller 162 is configured to extract features from the input image(s). The features may include but are not limited to a texture of the input image(s), a color composition of the input image(s) and edges in the input image(s). The texture of the input image(s) is for example extracted by Otsu thresholding which includes the image feature extraction controller 162 returning a single intensity threshold that separates pixels in the input image(s) into foreground and background (as explained in FIG. 5C). The color composition of the input image(s) is extracted for example by Gaussian Blur which highlights different regions of the input image(s) including a region of interest (ROI) with the artifact(s). The edge detection of the input image(s) is performed by any edge detection techniques such as for example, Sobel edge detection, Canny edge detection, Prewitt edge detection, Roberts edge detection, and fuzzy logic edge detection, etc. The extracted features are sent to the respective artifact management GANs 164a-164g by the image feature extraction controller 162. The image feature extraction controller 162 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The artifact management GANs 164a-164g include a first GAN 164a, a second GAN 164b, a third GAN 164c, a negative discriminator 164d, a division discriminator 164e, a refinement generator 164f and a refinement discriminator 164g. The artifact management GANs 164a-164g are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The artifact management GANs 164a-164g are configured to determine the ROI in the input image(s) which includes the artifact based on the extracted features. The artifact can be for example a shadow and a glare. Further, the artifact management GANs 164a-164g are configured to determine a set of loss values for each of the first GAN 164a, the third GAN 164c and the refinement generator 164f. Further, the first GAN 164a is configured to generate a first GAN image by removing darkest regions of the artifact in the input image(s) and using the texture of the input image(s) extracted by the image feature extraction controller 162. The first GAN 164a is, for example, a negative generator. The second GAN 164b is configured to generate a second GAN image by removing color continuous regions and texture continuous regions of the artifact in the input image(s) and using the color composition of the input image(s) extracted by the image feature extraction controller 162. The second GAN 164b is, for example, an artifact generator. The third GAN 164c is configured to generate a third GAN image by removing lightest regions of the artifact and adding white patch regions to the artifact in the input image(s) and using the edges in the input image(s) extracted by the image feature extraction controller 162. The third GAN 164c is for example a division generator. Further, the negative discriminator 164d is configured to receive the first GAN image and the input image(s) and send the output to the refinement GAN 164f. Similarly, the division discriminator 164e is configured to receive the third GAN image and the input image(s) and send the output to the refinement GAN 164f. The refinement GAN 164f receives the output from the negative discriminator 164d, the division discriminator 164e and the second GAN 164b. Further, the refinement GAN 164f connects with the refinement discriminator 164g to generate an intermediate output image by completely eliminating the artifact from the input image(s) (explained in detail in FIGS. 6A-6H). The artifact management GANs 164a-164g are trained with multiple images including various forms of artifacts to be able to generate the corresponding output images.

The mask classifier 166 is configured to receive the intermediate output image, the image illustrating edges in the intermediate output image, the input image and the image illustrating edges in the at least one input image, and generate the binary mask(s). The binary mask is used for categorizing the artifact or a portion of the artifact as either a wanted artifact or an unwanted artifact. The wanted artifact may be an artifact which does not need to be removed from the image, and the unwanted artifact may be an artifact for which it is appropriate to be removed from the image. A white portion of the binary mask indicates the portion of the artifact which is to be removed from the input image, i.e. the wanted artifact. For example, a shadow on text in an image of a document is categorized as unwanted artifact as the shadow make the text to be difficult to read. In another example, sand dunes in a desert landscape are considered as wanted as the shadow provides the depth effect to the landscape. Further, the mask classifier 166 is configured to apply the binary mask to each pixel of the input image to retain or remove the appropriate portions of the artifact. The mask classifier 166 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The image quality controller 168 is configured to generate multiple versions of the output image by varying a gamma value associated with the final output image. Further, a graph is plotted with naturalness image quality evaluator (NIQE) value for each of the versions of the output image to determine a best quality output image. The best quality output image is a version of the final output image with the least NIQE value in a stable region of the gamma plot (explained in detail in FIGS. 8A-8E). The image quality controller 168 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The image effects controller 170 is configured to retrieve the binary mask from the memory 120, and apply the binary mask to any other image directly to add effects associated with the artifacts. For example, the image effects controller 170 may add glare to the image, or add shadow to the image etc. The image effects controller 170 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the display 180 is configured to display the final output image with the portions of the artifact which is classified as wanted. In other words, the artifact classified as wanted is not removed from the image, the artifact classified as unwanted is removed from the image. The display 180 is implemented using touch sensitive technology and includes one of liquid crystal display (LCD), light emitting diode (LED), etc.

Although FIG. 3 shows the hardware elements of the electronic device 100, it is to be understood that other embodiments are not limited thereon. In other embodiments, the electronic device 100 may include less or more elements. Further, the labels or names of the elements are used only for illustrative purposes and does not limit the scope of the invention. One or more components can be combined together to perform the same or substantially the same function.

Figure 4A:
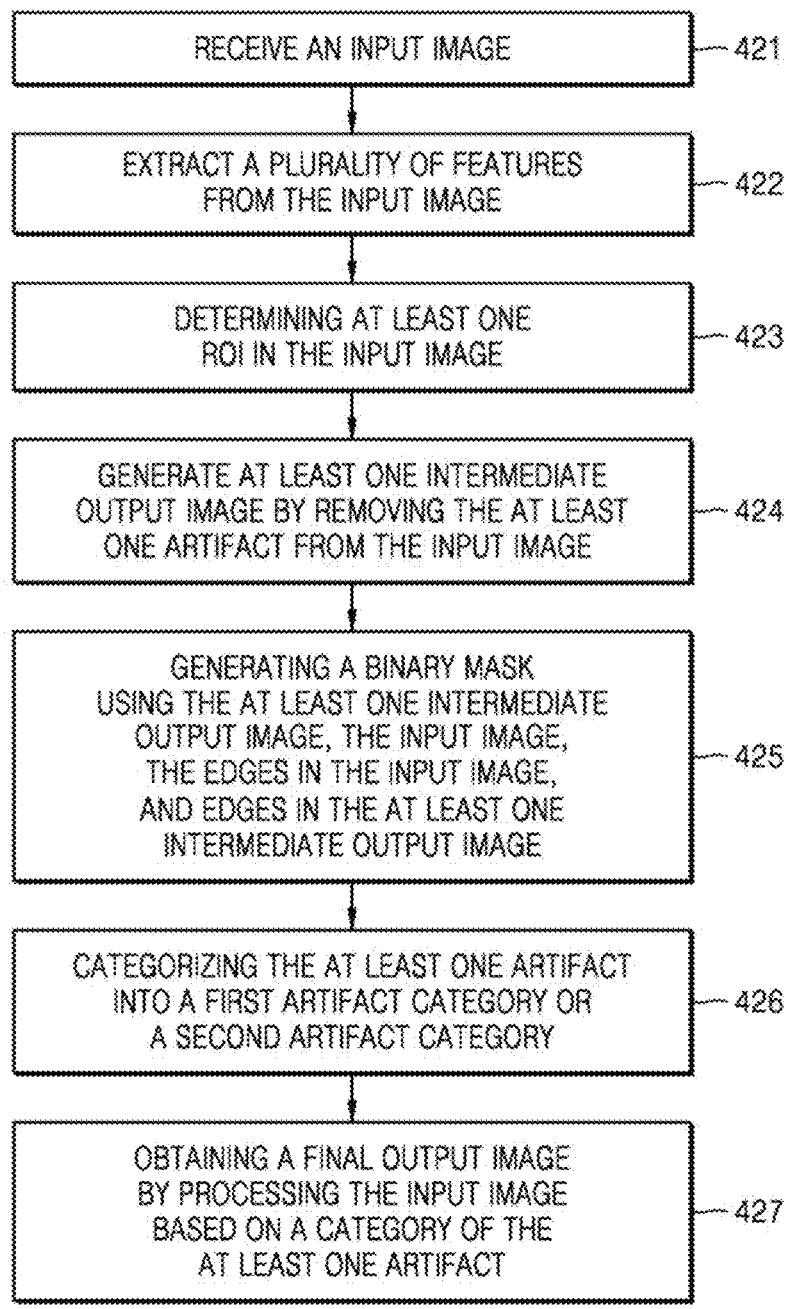
FIG. 4A is a flow chart illustrating the method for managing artifacts of the image by the electronic device 100, according to the embodiments as disclosed herein.

FIG. 4A is a flow chart illustrating the method for managing artifacts of the image by the electronic device 100, according to the embodiments as disclosed herein.

Referring to FIG. 4A, in operation 421, the electronic device 100 receives an input image. For example, in the electronic device 100 as illustrated in FIG. 3, the image artifact controller 160 is configured to receive the input image.

In operation 422, the electronic device 100 extracts the features from the input image. For example, in the electronic device 100 as illustrated in FIG. 3, the image artifact controller 160 is configured to extract the features from the input image. The features may include a texture of the input image, a color composition of the input image and edges in the input image.

In operation 423, the electronic device 100 determines the ROI in the input image including the artifact based on the extracted features. For example, in the electronic device 100 as illustrated in FIG. 3, the image artifact controller 160 is configured to determine the ROI in the input image including the artifact based on the extracted features.

In operation 424, the electronic device 100 generates the intermediate output image by removing the artifact using the multiple GANs. For example, in the electronic device 100 as illustrated in FIG. 3, the image artifact controller 160 is configured to generate the intermediate output image by removing the artifact using the multiple GANs 164a-164g.

In operation 425, the electronic device 100 generates the binary mask using the intermediate output image, the input image, the image illustrating edges in the input image and the image illustrating edges in the intermediate output image, and decides whether the artifact is wanted or unwanted. For example, in the electronic device 100 as illustrated in FIG. 3, the image artifact controller 160 is configured to generate the binary mask using the intermediate output image, the input image, the image illustrating edges in the input image and the image illustrating edges in the intermediate output image and decide whether the artifact is wanted or unwanted.

In operation 426, the electronic device 100 categorizes the at least one artifact into a first artifact category or a second artifact category, based on the binary mask to the input image. For example, as mentioned in the operation 425, the artifact can be classified into the wanted artifact or the unwanted artifact. In such case, the first artifact category may be the wanted artifact and the second artifact category may be the unwanted artifact. The binary mask can indicate whether the artifact or the portion of the artifact is the wanted artifact or the unwanted artifact. A white portion of the binary mask may indicate the portion of the artifact which is to be removed from the input image, i.e. the wanted artifact, and a black portion of the binary mask may indicate the portion of the artifact which is to be maintained. The white portion of the binary mask may have value of one, and the black portion of the binary mask may have value of zero.

In operation 427, the electronic device 100 obtains a final output image by processing the input image based on a category of the at least one artifact corresponding to the first artifact category and or second artifact category.

Figure 4B:
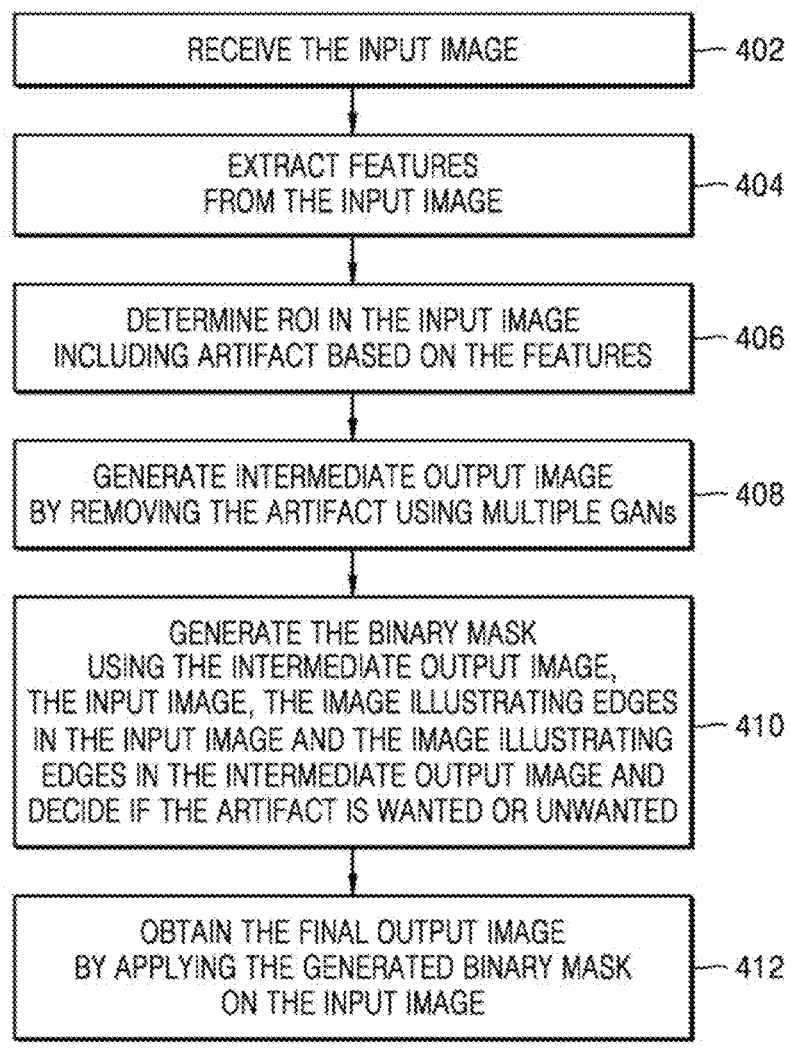
FIG. 4B is a flow chart illustrating a method for managing artifact of the image by the electronic device, according to embodiments as disclosed herein.

FIG. 4B is a flow chart illustrating the method for managing artifacts of the image by the electronic device 100, according to the embodiments as disclosed herein.

Referring to FIG. 4B, in operation 402, the electronic device 100 receives the input image(s). For example, in the electronic device 100 as illustrated in FIG. 3, the image artifact controller 160 is configured to receive the input image(s).

In operation 404, the electronic device 100 extracts the features from the input image(s). For example, in the electronic device 100 as illustrated in FIG. 3, the image artifact controller 160 is configured to extract the features from the input image(s).

In operation 406, the electronic device 100 determines the ROI in the input image(s) including the artifact based on the extracted features. For example, in the electronic device 100 as illustrated in FIG. 3, the image artifact controller 160 is configured to determine the ROI in the input image(s) including the artifact based on the extracted features.

In operation 408, the electronic device 100 generates the intermediate output image by removing the artifact using the multiple GANs. For example, in the electronic device 100 as illustrated in FIG. 3, the image artifact controller 160 is configured to generate the intermediate output image by removing the artifact using the multiple GANs 164a-164g.

In operation 410, the electronic device 100 generates the binary mask using the intermediate output image, the input image, the image illustrating edges in the input image and the image illustrating edges in the intermediate output image, and decides if the artifact is wanted or unwanted. For example, in the electronic device 100 as illustrated in FIG. 3, the image artifact controller 160 is configured to generate the binary mask using the intermediate output image, the input image, the image illustrating edges in the input image and the image illustrating edges in the intermediate output image and decide whether the artifact is wanted or unwanted.

In operation 412, the electronic device 100 obtains the final output image by applying the generated binary mask to the input image(s). For example, in the electronic device 100 as illustrated in FIG. 3, the image artifact controller 160 is configured to obtain the final output image by applying the generated binary mask to the input image(s).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5A:
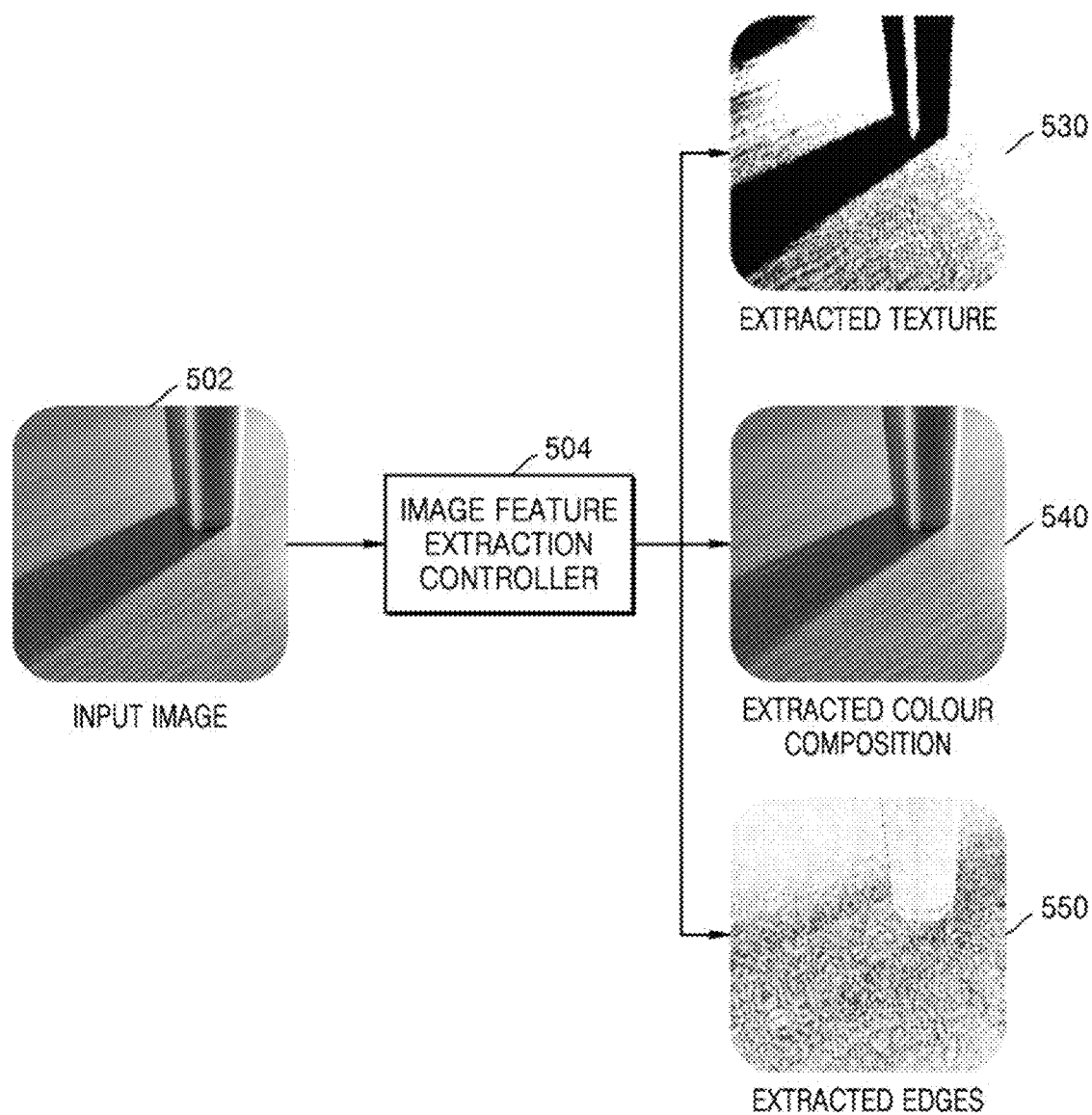
FIG. 5A is an example illustrating extraction of multiple features from an input image(s) by the electronic device, according to embodiments as disclosed herein.

FIG. 5A is an example illustrating extraction of the multiple features from the input image(s) by the electronic device 100, according to the embodiments as disclosed herein.

Referring to FIG. 5A, in operation 502 the electronic device 100 receives the input image. In operation 504, the image feature extraction controller 162 is used to manipulate the input image by performing standard operations on an image matrix of the input image to highlight the artifact in the input image such as the shadow, the glared regions and preserve the texture in the input image.

The multiple features may be extracted so that during the training phase and the inference phase, the texture feature 530, the edges feature 550 and the color composition 540 of the input image are extracted and preserved. For example, the texture feature 530 may be a result of Otsu thresholding for the input image, the color composition 540 may be a result of Gaussian blur for the input image, and the edge feature 550 may be a result of edge detection.

The removal of artifacts from the input image may be considered as the removal of information from the input image. Therefore, the region where the artifacts are present on removing the artifact may lose some information such as for example the texture, the color composition, a Hue, Saturation and Value (HSV) map, the edges etc. The image feature extraction controller 504 (corresponding to the image feature extraction controller 162 of FIG. 3) provides great detail about the removed information so that the removed information can be incorporated into the final output image. Further, based on structural similarity and functionality of the extracted features, the extracted features are mapped as inputs to the corresponding GANs 164a-164g. For example, the texture is mapped to the first GAN 164a, the color composition is mapped to the second GAN 164b and the edges of the artifact extracted from the input image is mapped to the third GAN 164c. The extracted features may be used in the GAN generators.

Figure 5B:
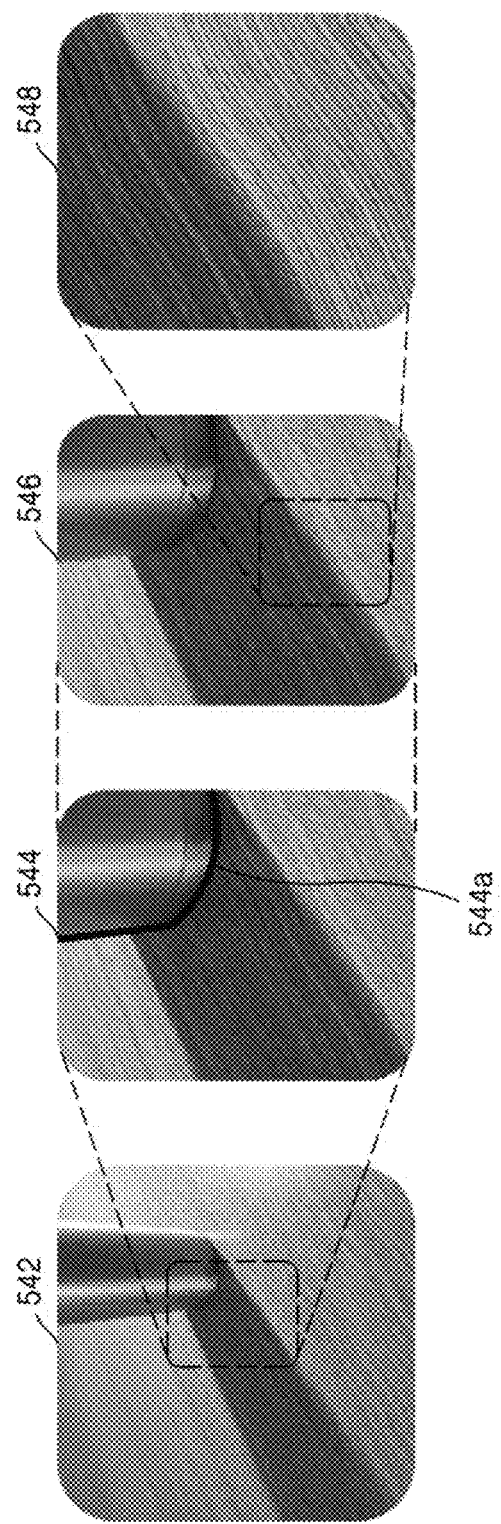
FIG. 5B is an example illustrating extraction of color composition of the input image using Gaussian Blur by the electronic device, according to embodiments as disclosed herein.
Figure 5B:
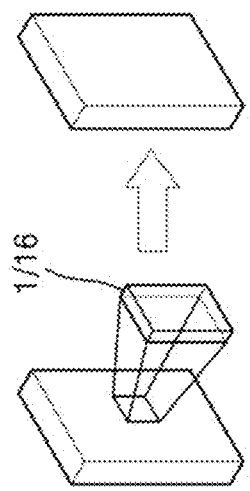

FIG. 5B is an example illustrating extraction of the color composition of the input image using the Gaussian Blur by the electronic device 100, according to the embodiments as disclosed herein.

Referring to FIG. 5B, the input image is passed through a Gaussian filter of the image feature extraction controller 504 to obtain the Gaussian blur for extracting the color composition of the input image. Also, Gaussian blur may be used to extract the texture of the input image. To determine the Gaussian Blur, Gaussian filters of Gaussian kernel size 3×3 and convolution are performed on the input image to obtain different smoothed images as to highlight different regions of the artifact in the input image. The Gaussian filter helps to preserve the color composition and texture of the input image. The Gaussian Blur reduces an image noise and reduces detail.

As shown in reference number 542, the edge, the shadow and the glare in the input image are identified in the input image and in reference number 544, the edges of the ROI are labeled as 544a. Further, in reference numbers 546 and 548, the various curves and patterns depicting the texture of the input image are identified. As mentioned above, the Gaussian filter helps to preserve the color composition and texture of the input image. The Gaussian Blur reduces an image noise and reduces detail. Thus, when the input image is passed through a Gaussian filter of the image feature extraction controller 504, the color composition of the input image or the texture of the input image are extracted from the Gaussian blurred input image.

FIG. 5C is an example illustrating extraction of the texture of the input image using the Otsu thresholding by the electronic device 100, according to the embodiments as disclosed herein.

Referring to FIG. 5C, the Otsu thresholding is performed on the input image for extracting the texture of the input image. Image thresholding is used to binarize the image based on pixel intensities. The input to such thresholding algorithm is usually a grayscale image and a threshold. The output is a binary image. If the intensity of a pixel in the input image is greater than a threshold, the corresponding output pixel is marked as white (foreground), and if the input pixel intensity intensity is less than or equal to the threshold, the output pixel location is marked black (background). In the Otsu thresholding, a weight, mean and variance for foreground (greater than Vth) $\{W_f$: Weight, $\mu_f$: Mean and $\sigma_f^2$: Variance foreground$\}$ and background (lower than Vth) $\{W_b$: Weight, $\mu_b$: Mean and $\sigma_b^2$: Variance background$\}$ are determined. Then a variance ($\sigma_w^2$) is determined within each class. The best Vth for which $\sigma_w^2$ is highest is selected as the threshold and the background pixels are set to zero and foreground to the highest pixel value.

$$\sigma_w^2 = W_b \sigma_b^2 + W_f \sigma_f^2 \qquad (1)$$

In operation 532, the input image is received, and in operation 534, a histogram of the input image is determined with $N_{bins}=20$ of all pixel values of the input image. In operation 536, based on the histogram the electronic device 100 determines the inner variance with respect to each of the pixels in the input image. Further, it is assumed that the inner variance is highest at pixel value 165 as shown in reference number 537 and hence pixel value 165 is regarded as a threshold value. Thus, the pixel values less than 165 are given pixel values as 0 and the pixel values greater than 165 are given as 255 pixel values. In other words, the pixel of which values is less than 165 is classified into the foreground, and the pixel of which values is greater than 165 is classified into background. Therefore, the background and foreground in the input image are separated by processing the input image according to the Otsu thresholding. In operation 538, the result of the Otsu thresholding for the input image is provided as an output image. The result of the Otsu thresholding may include the texture extracted from the input image FIG. 6A illustrates an architecture including the multiple GANs 164*a*-164*g* used to obtain the intermediate output image without the artifacts by the electronic device 100, according to the embodiments as disclosed herein.

Figure 6A:
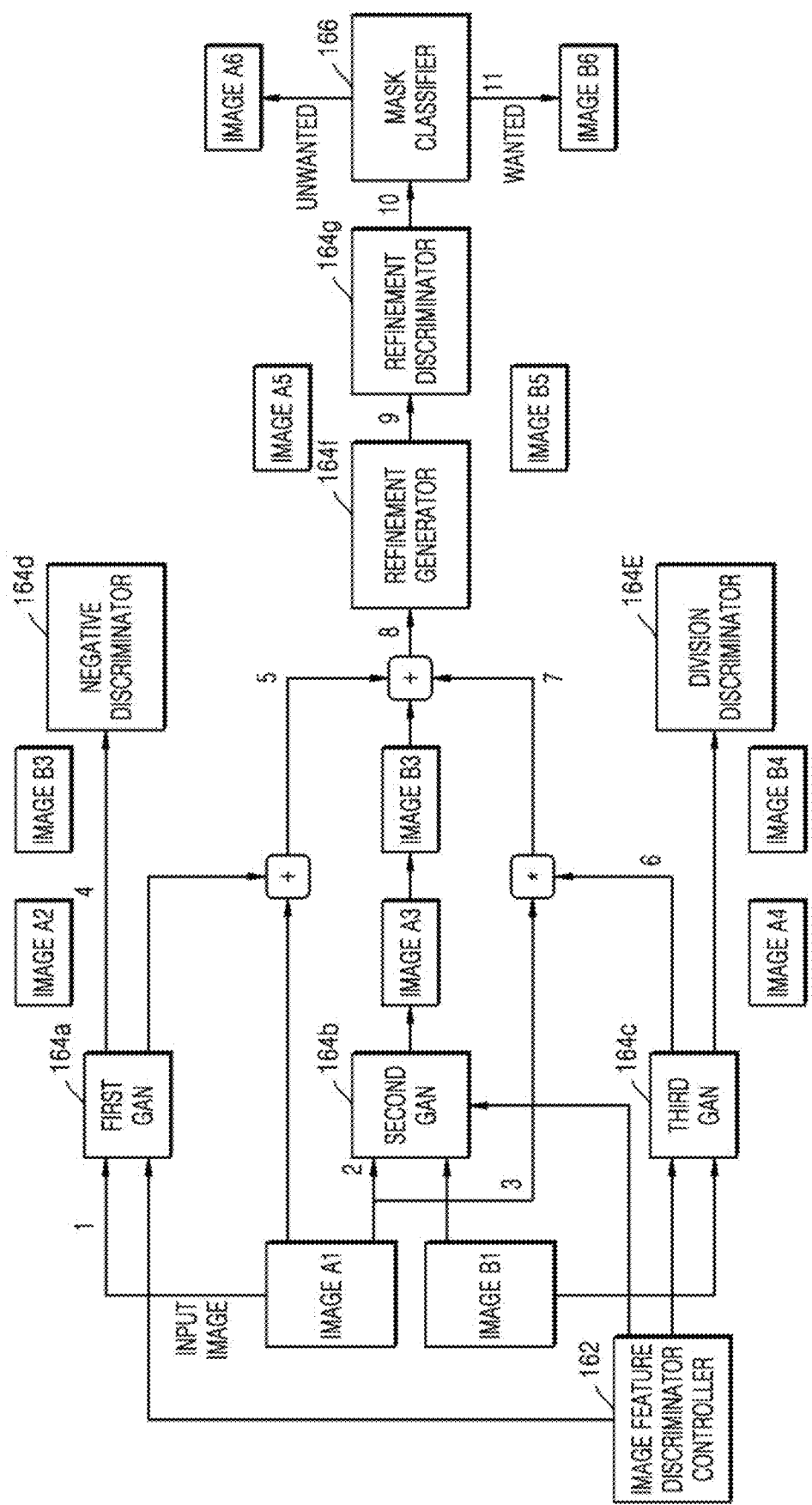
FIG. 6A illustrates an architecture including multiple GANs used to obtain an intermediate output image without the artifacts by the electronic device, according to embodiments as disclosed herein.

Referring to FIG. 6A, the multiple GANs 164*a*-164*g* include the first GAN 164*a*, the second GAN 164*b*, the third GAN 164*c*, the negative discriminator 164*d*, the division discriminator 164*e*, the refinement generator 164*f* and the refinement discriminator 164*g*.

At 1, the first GAN 164*a* may be the negative generator which receives the input image and the texture of the input image extracted by the image feature extraction controller 162. The result of Otsu thresholding for the input image may be used as the texture feature of the input image and input to the first GAN 164*a*. The first GAN 164*a* may generate negative samples for the input. For example, the first GAN 164*a* may remove the darkest region of the artifacts in the input image and generate the first GAN image which is a negative image. At 2, the second GAN 164*b* may be the artifact generator which receives the input image and the Gaussian blurred image including the feature of color composition of the input image extracted by the image feature extraction controller 162.

The second GAN 164*b* removes the color and texture continuous region of artifacts in the input image and generates the second GAN image. At 3, the third GAN 164*c* is the division generator which receives the input image and the edges of the input image detected by the image feature extraction controller 162. The result of edge detection may be used as the edges of the input image. The third GAN 164*c* removes the lightest region of the artifacts but adds a white patch and generates the third GAN image. In operation 4, the negative discriminator 164*d* receives the first GAN image and compares the same with the input image to determine if the first GAN image is real. Similarly, in operation 6 the division discriminator 164*e* receives the third GAN image and compares the same with the input image to determine if the third GAN image is real.

In operation 5, the first GAN image and the input image are fed to an adder. Similarly, in operation 7, the third GAN image and the input image are fed to a multiplier. The output from the multiplier and the adder are then fed to the adder in operation 8 to generate a combined final image. The combined final image is then passed through the refinement generator 164*f* for refining the image (operation 9) and in operation 10 the image is passed through the refinement discriminator 164*g* to generate the intermediate output image by removing the artifact. The intermediate output image is then passed through the mask classifier 166 to determine whether the artifact/portion of the artifact in the input image is wanted or unwanted.

Further, based on whether the artifact is the wanted artifact or the unwanted artifact, the electronic device 100 provides different weightage and preference to respective GANs. The weightage of the individual GANs is determined based on a variable loss calculation.

Adversarial Loss: It is joint adversarial loss for the multiple GANs 164*a*-164*g*:

$$\text{Loss}_{Adv} = [\{\log(D(I_{in})) + \log(1 - D(I_{G4})) + \log(D(I_{out} - I_{in})) + \log(D(I_{G1})) + \log(D(I_{out}/I_{in})) + \log(D(I_{G3}))\}] \qquad (2)$$

Division Loss: calculates L1 norm (Absolute loss) between division map and image generated by the third GAN 164*c* division generator.

$$\text{Loss}_{Div} = abs((I_{out}/I_{in}) - I_{G3}) \qquad (3)$$

Negative Loss: A measure of absolute loss between negative map and image generated by the first GAN 164*c* negative generator. Gives a measure to brightness in shadow region:

$$\text{Loss}_{Neg} = abs((I_{out}/I_{in}) - I_{G1}) \qquad (4)$$

Feature Loss: Absolute loss calculated between features of original image and image generated by the refinement generator 164*f*.

$$\text{Loss}_{feat} = abs(I_{infeat}/I_{GA(feat)}) \qquad (5)$$

Therefore, the total loss: Calculated by adding all the losses according to weights provided as per type of the artifact as:

$$\text{Loss}_{Total} = \text{Loss}_{Adv} + \lambda_1 * \text{Loss}_{Div} + \lambda_2 * \text{Loss}_{Neg} + \lambda_3 * \text{Loss}_{feat.} \qquad (6)$$

where $I_{out}$=Output pair of image provided during training, $I_{in}$=Input pair of image provided during training, $D(I_{Gi})$ =Discriminator loss on output image of $i_{th}$ generator, $I_{Gi}$=Output from $i_{th}$ generator, $\lambda_1$, $\lambda_2$ and $\lambda_3$ are hyperparameters and are used appropriately to train the model and get desired output, $Loss_{Adv.}$ is general standard loss used by every GAN network as suggested in initial GAN paper but using other losses improves the result.

The performance and computation time with respect to the use of the multiple GANs 164a-164g increases the training time by three times as the multiple losses need to be calculated for each of the multiple GANs 164a-164g pairs. However, while inferencing the output the computation remains the same as the inference is obtained only with the refinement discriminator 164g which gives the intermediate output image by removing the artifact completely.

Individually each of the multiple GANs 164a-164g performs the tasks separately but a combination of the multiple GANs 164a-164g provides the best possible result. Due to the use the multiple GANs 164a-164g the electronic device 100 is able to handle a complex scenario as well as a simple scenario easily. Also, the multiple GANs 164a-164g performing multiple functions allow the electronic device 100 to extract the output of one generator and use the output for other purpose if required. For example, in case of the negative generator, the user may be able to use the negative photo of the image directly.

Figure 6B:
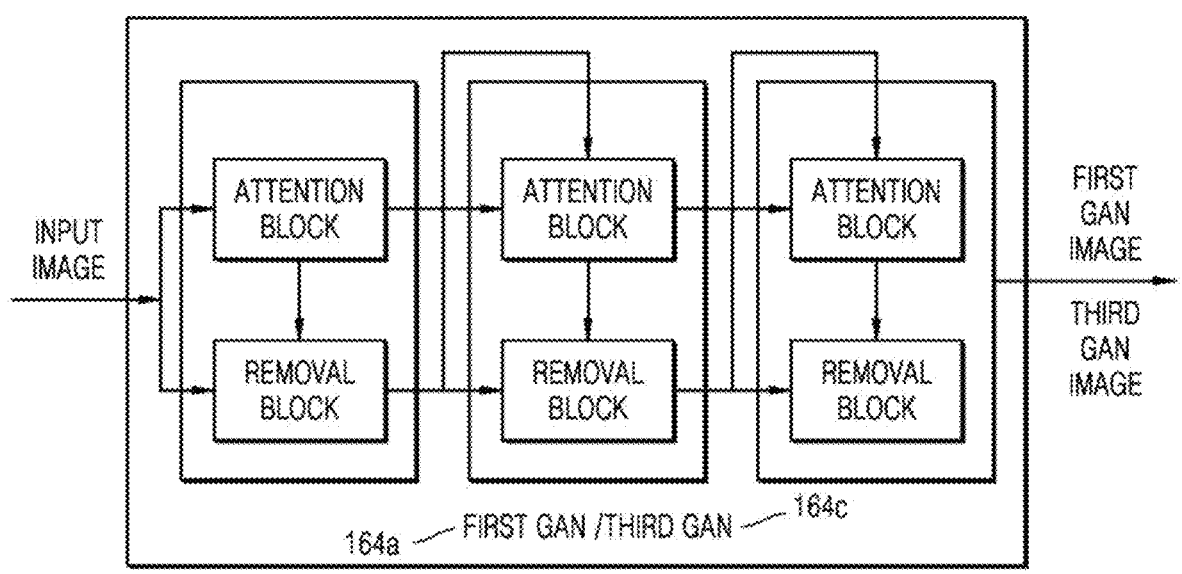
FIG. 6B illustrates an architecture of a first GAN and a third GAN of an image artifact controller, according to embodiments as disclosed herein.

FIG. 6B illustrates an architecture of the first GAN 164a and the third GAN 164c of the image artifact controller 160, according to the embodiments as disclosed herein.

Referring to FIG. 6B, the architecture of the first GAN 164a and the third GAN 164c are the same. However, the inputs to the first GAN 164a and the third GAN 164c are different and hence the corresponding outputs are also different. The first GAN 164a is the negative generator which receives the input image and the Otsu thresholding texture extract as the inputs. The third GAN 164c is the division generator which receives the input image and the edge detected as the inputs. The first GAN 164a and the third GAN 164c provide additional support to the main generators i.e., the second GAN 164b and the refinement generator 164f.

Both the first GAN 164a and the third GAN 164c include a network of attention blocks and removal blocks. The attention blocks selectively choose what the network wants to observe, locate artifacts of the input image and make the attention of the removal block focusing on the detected regions. Each block is refined in a coarse-to-fine fashion to handle a complex scene captured in the image. Three subsequent blocks of the attention blocks and removal blocks provide a good trade-off between performance and complexity.

Figure 6C:
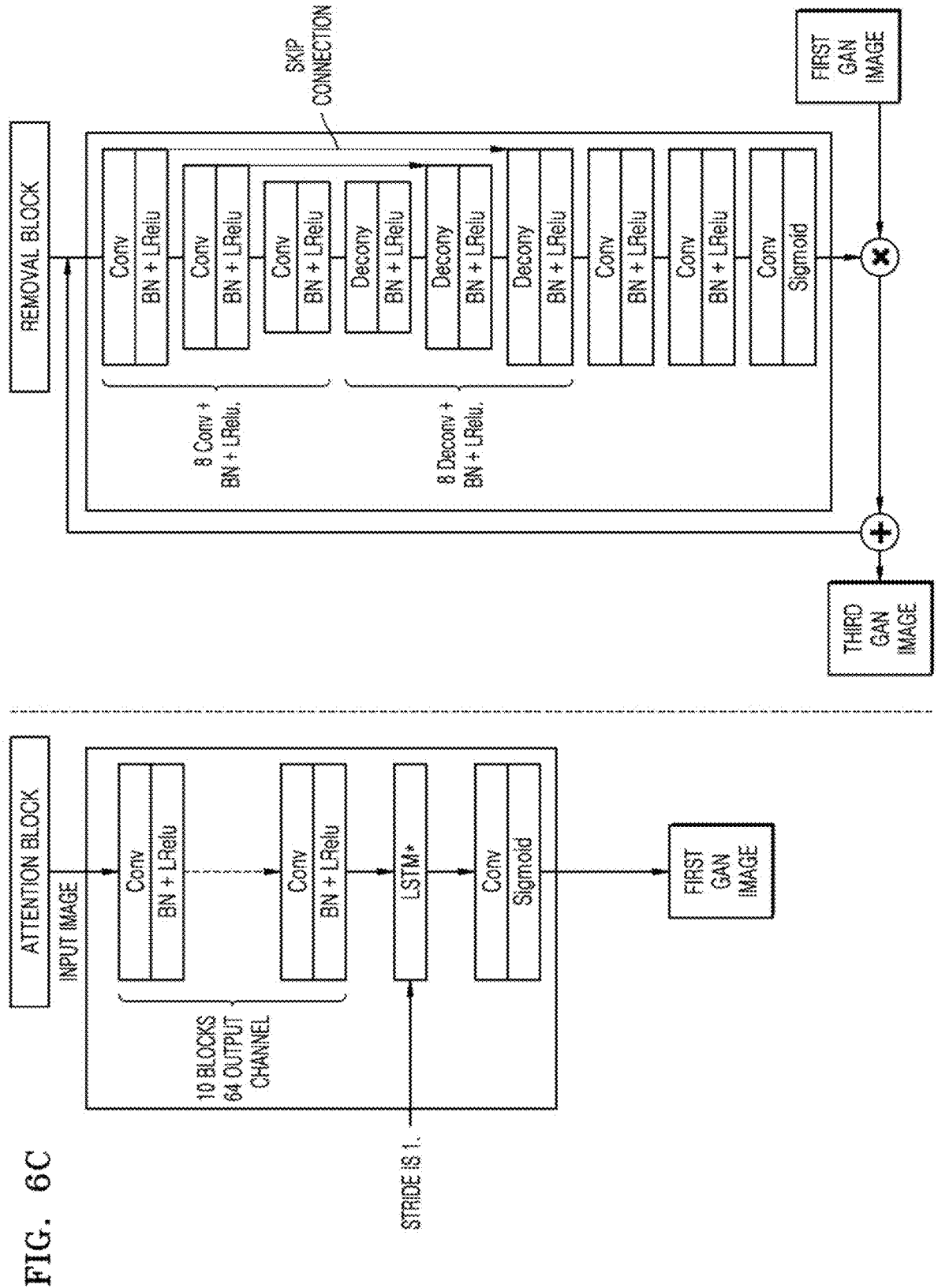
FIG. 6C illustrates an architecture of an attention block and a removal block of each of the first GAN and the third GAN, according to embodiments as disclosed herein.

FIG. 6C illustrates an architecture of the attention block and the removal block of each of the first GAN 164a and the third GAN 164c, according to the embodiments as disclosed herein.

Referring to FIG. 6C, the attention block provides attention i.e. to observe and locate the ROI including the artifact to make the process more focused. The attention block includes ten (10) convolutional layers (Conv) with Batch Normalization (BN) and Leaky Rectified Linear Unit (ReLU) activation Function (Conv+BN+Leaky ReLU). The attention block also includes a Long Term Short Memory (LSTM) layer (explained further in FIG. 6D) to utilize the information from a previous output from a preceding step and learn from previous state and current state which is required in the generators and will generate attention map for succeeding output stages.

The removal block generates the artifact free image. The removal block includes eight (8) Conv+BN+Leaky ReLU to extract the multiple features from the image. Further, the removal block also includes 8 de-convolutional layers with Batch Normalization and Leaky ReLU activation function (Deconv+BN+Leaky ReLU) to map to a particular distribution. Skip connections are used for a number of channels and preserve context information of the layer. Last de-convolutional layers, 2 Conv+BN+Leaky ReLU may extract a feature map after performing the de-convolution. Final Convolutional and Sigmoid layer convert the feature map to a 3 channel space of the same size as the input.

Figure 6D:
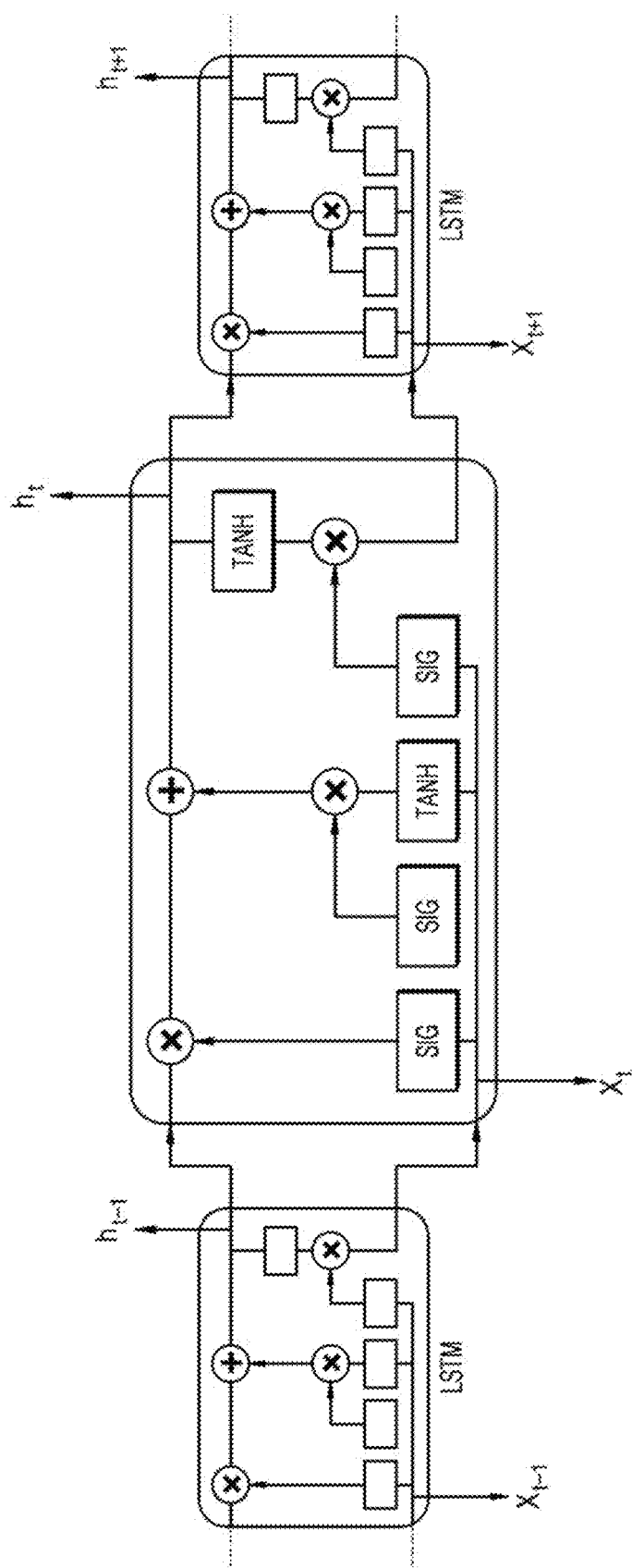
FIG. 6D illustrates architecture of a long short-term memory (LSTM) of the attention block of the first GAN, according to embodiments as disclosed herein.

FIG. 6D illustrates architecture of a long short-term memory (LSTM) of the attention block of the first GAN 164a, according to the embodiments as disclosed herein.

Referring to FIG. 6D, the LSTM of the attention block of the first GAN 164a is provided. The LSTM is an artificial recurrent neural network (RNN) architecture used for deep learning. The LSTM has feedback connections and can process single data points (such as images). The LSTM has the ability to add or remove cell state, carefully regulated by gates. The LSTM of the attention block includes 4 gates and 3 sigmoid for protection and controlling and 1 tanh classifier. The Sig gates provide value between 0 and 1. In the proposed method, the sig gates provide shadowed and glared part of the images close to 0, i.e., the shadowed and glared part of the images are dropped and not used in subsequent layers of the first GAN 164a.

Figure 6E:
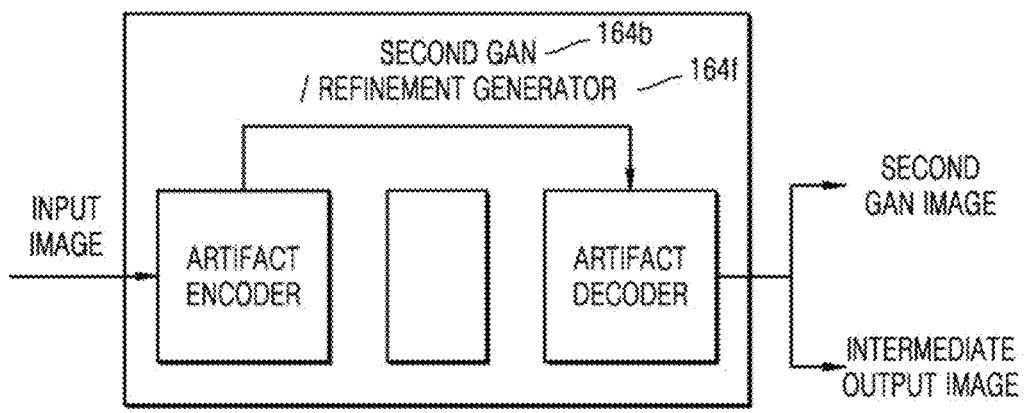
FIG. 6E illustrates schematic of a second GAN and a refinement generator of the image artifact controller, according to embodiments as disclosed herein.

FIG. 6E illustrates a schematic diagram of the second GAN 164b and the refinement generator 164f of the image artifact controller 160, according to the embodiments as disclosed herein.

Referring to FIG. 6E, the schematic of the second GAN 164b and the refinement generator 164f are the same. However, the inputs to the second GAN 164b and the refinement generator 164f are different and hence the corresponding outputs are different. The second GAN 164b removes the artifact in the first pass and the refinement generator 164f of the image artifact controller 160 is combines the outputs from previous stage generators and modifies the output from a coarse output to a fine output.

Figure 6F:
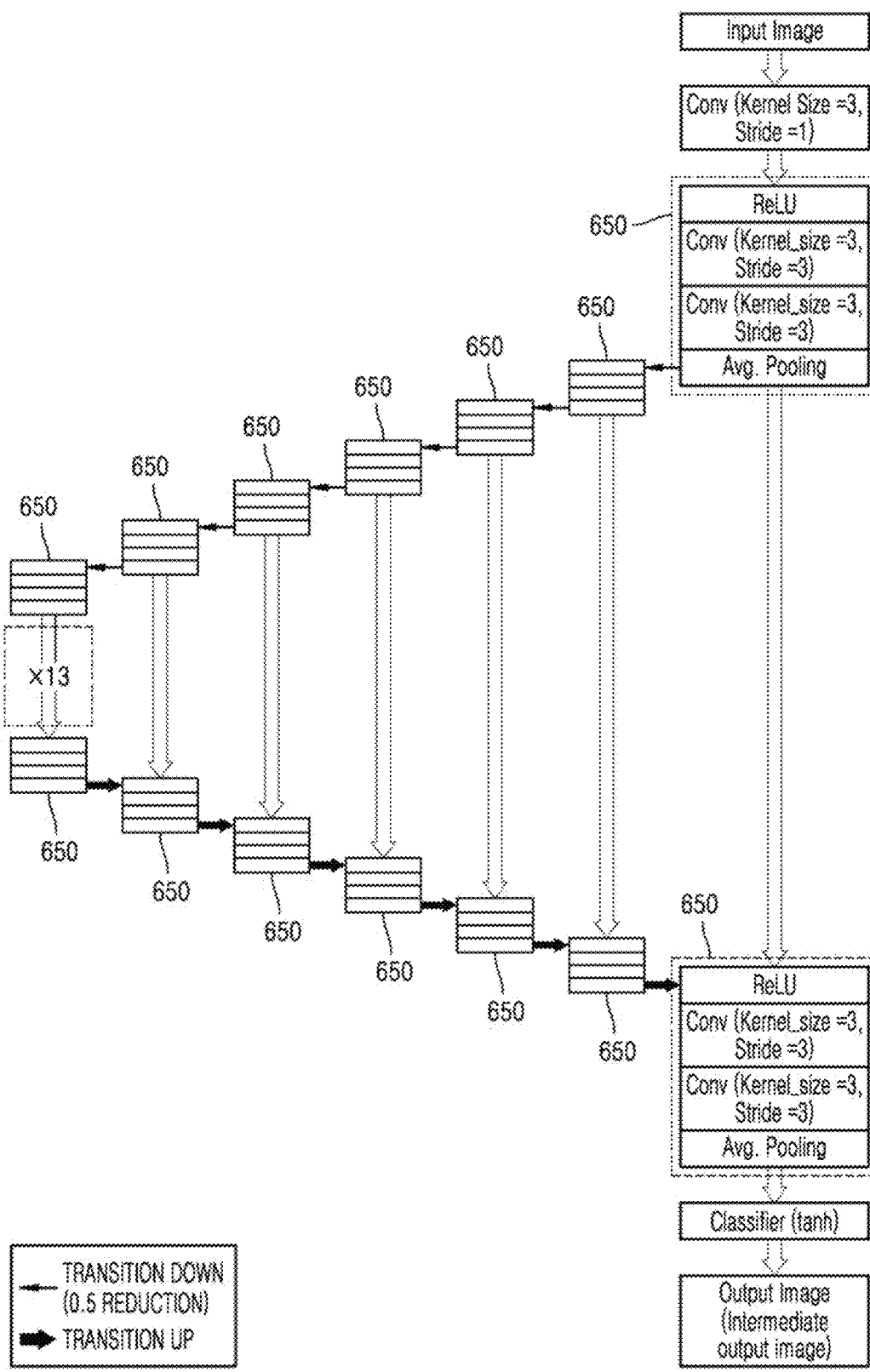
FIG. 6F illustrates a detailed internal architecture of the second GAN and the refinement generator of the image artifact controller, according to embodiments as disclosed herein.

FIG. 6F illustrates a detailed internal architecture of the second GAN 164b and the refinement generator 164f of the image artifact controller 160, according to the embodiments as disclosed herein.

Referring to FIG. 6F, the detailed internal architecture of the second GAN 164b and the refinement generator 164f are the same. However, the inputs to the second GAN 164b and the refinement generator 164f are different and hence the corresponding outputs also differ.

Each of the second GAN 164b and the refinement generator 164f includes six (6) blocks of (ReLU+2 Convs+ Average Pooling) (650) in the encoder layer with transition down after each block and with skip connection to the decoder layer with transition up after each block. A last bottom layer has 15 blocks of (ReLU+2 Convs+Average Pooling) (650). At the output stage there is a tanh classifier to convert into three (3) channels output image.

The second GAN 164b receives the input image along with the Gaussian blur feature associated with the color composition of the artifact in the input image. The output of the second GAN 164b is generated by removing the color and the texture of a continuous region of artifact. The refinement generator 164f receives the first GAN image, the second GAN image and the third GAN image as inputs and refines the output of the previously combined GANs.

Figure 6G:
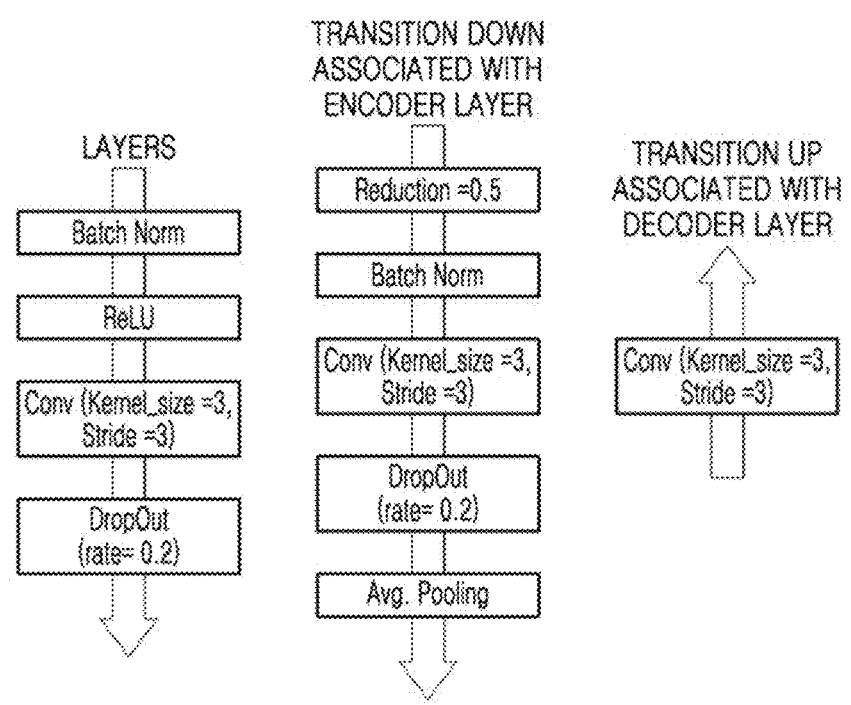
FIG. 6G illustrates the transitions associated with multiple layers of the second GAN and the refinement generator, according to embodiments as disclosed herein.

FIG. 6G illustrates the transitions associated with multiple layers of the second GAN 164b and the refinement generator 164f, according to the embodiments as disclosed herein.

Referring to FIG. 6G, various layers of the second GAN 164b and the refinement generator 164f are provided. The encoder layer with transitions down after each block is shown. The decoder layer with transitions up after each block is shown. The encoder layer and the decoder layer are connected with a skip connection for a number of channels and preserve context information of the layer.

Figure 6H:
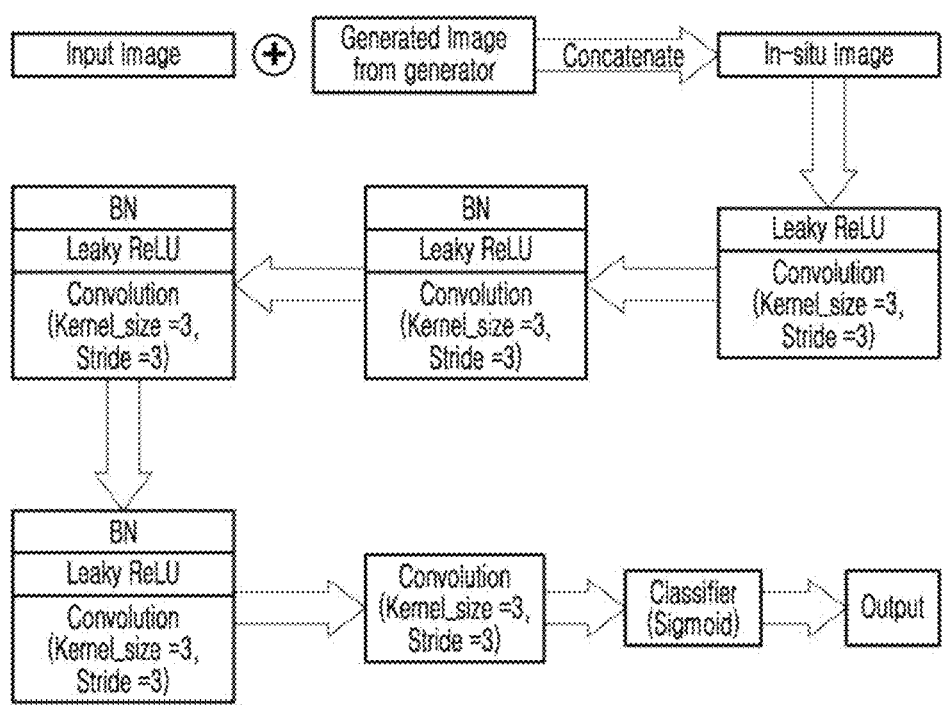
FIG. 6H illustrates architecture of a negative discriminator, a division discriminator and a refinement discriminator of the image artifact controller, according to embodiments as disclosed herein.

FIG. 6H illustrates architecture of the negative discriminator 164d, the division discriminator 164e and the refinement discriminator 164g of the image artifact controller 160, according to the embodiments as disclosed herein.

Referring to FIG. 6H, the architecture of the negative discriminator 164d, the division discriminator 164e and the refinement discriminator 164g are the same. However, the inputs to the individual discriminators are different and hence the corresponding outputs are also different.

The negative discriminator 164d receives the input image and the first GAN image as the inputs. The first GAN image is generated by the first GAN 164a by removing the darkest region of artifact from the input image. The negative discriminator 164d concatenates the input image and the first GAN image. Further, the concatenated image is passed through several levels of convolution to determine whether the first GAN image is real or fake. The real image is forwarded to the next level and the fake image is discarded.

Similarly, the division discriminator 164e receives the input image and the third GAN image as the inputs. The third GAN image is generated by removing the lightest region of artifact from the input image and adding white patch.

The refinement discriminator 164g is the final discriminator which provides the intermediate output image by removing all the artifacts in the input image.

Figure 7A:
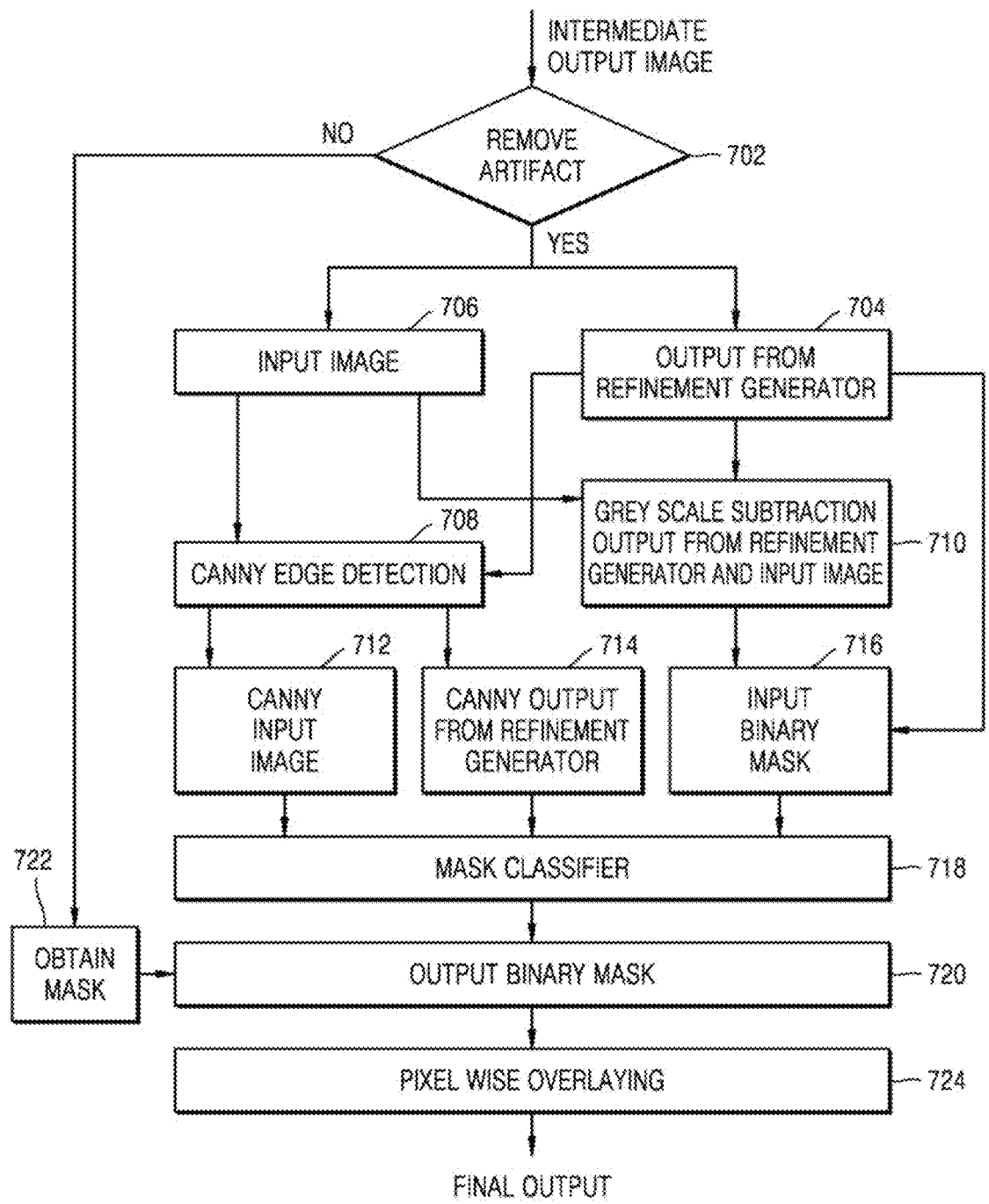
FIG. 7A is a flow chart illustrating a method for determining whether the artifact is wanted or unwanted by a mask classifier, according to embodiments as disclosed herein.

FIG. 7A is a flow chart illustrating the method for determining whether the artifact is wanted or unwanted by the mask classifier 166, according to the embodiments as disclosed herein.

The mask classifier 166 is used to preserve the artifacts which are essential to the image but removed by the multiple GANs 164a-164g.

Referring to FIG. 7A, in operation 702, the electronic device 100 determines whether the artifact in the intermediate output image should be removed or not.

In case that the electronic device 100 determines whether the artifact in the intermediate output image should be removed, in operation 704, the electronic device 100 obtains the output from the refinement generator 164f, and in operation 706, the electronic device obtains the input image. In operation 708, the electronic device 100 performs the canny edge detection on the input image and the output from the refinement generator 164f, respectively. In operation 712, the electronic device 100 obtains the canny input image, and in operation 714, the electronic device 100 obtains the canny output from the refinement generator 164f.

Further, in operation 710, the grey scale subtraction output is obtained using the refinement generator 164f output and the input image. Thus, in operation 716, the input binary mask is obtained.

In operation 718, the mask classifier 166 uses the canny input image, the canny output from the refinement generator 164f and the input binary mask, and in operation 720, the output binary mask is obtained which intelligently determines the portions of the artifact which needs to be retained and the portions of the artifact which needs to be removed. In case that the electronic device 100 determines whether the artifact in the intermediate output image should not be removed, in operation 722, the output binary mask is generated with the artifact or the portion of the artifact. In such case, the white portion of the binary mask indicates the part of artifact to be removed finally. Further, the white portion of the binary mask is the region to be copied from the output from the refinement generator 164f onto the input image. In other words, the unwanted artifact indicated by the white portion of the binary mask is removed from the input image and the unwanted artifact is replaced by corresponding part of the output from the refinement generator 164f. The wanted artifact indicated by the black portion of the binary mask is not removed from the input image, and the wanted artifact maintains without being replaced by the output from the refinement generator 164f.

Further, in operation 724, the electronic device 100 performs a pixel wise overlaying of the output binary mask on the input image to obtain the final enhanced output image. The method performed by the mask classifier 166 can be extended into user guided selection of a region of artifact where only the white portion of the binary mask is copied from the output from the refinement generator 164f onto the input image to generate the output image.

Figure 7B:
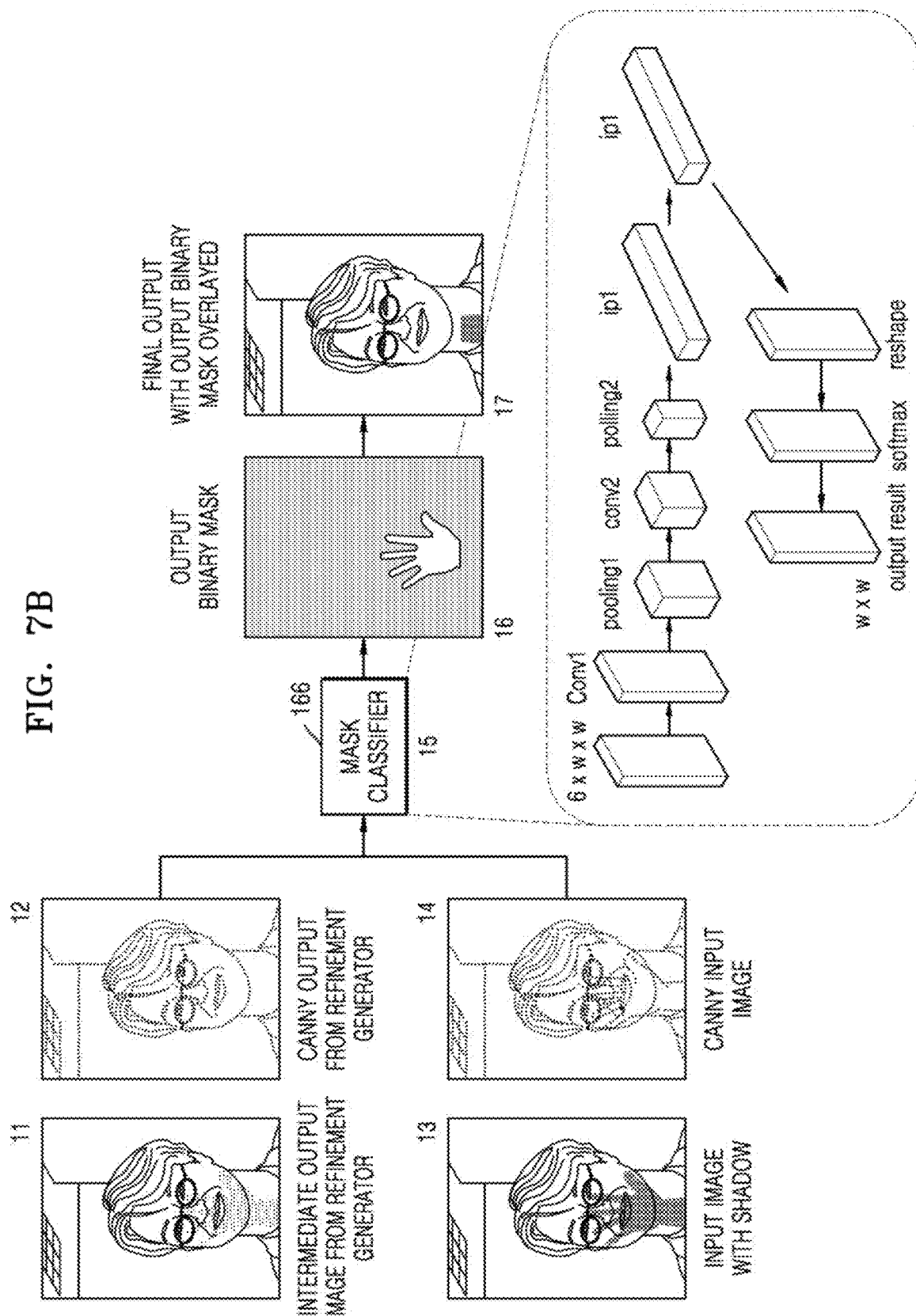
FIG. 7B is an example illustrating a process of the mask classifier, according to embodiments as disclosed herein.

FIG. 7B is an example illustrating the process of the mask classifier 166, according to the embodiments as disclosed herein.

Masking enables the control of a transparency level of the artifact in the input image without affecting the actual background. Referring to FIG. 7B in conjunction with FIG. 7A, the mask classifier 166 in operation 11, receives the intermediate output image from refinement generator 164f, in operation 12 receives the canny output from refinement generator 164f, in operation 13 receives the input image with the shadow and in operation 14 receives the canny input image. These inputs provide crucial information to the mask classifier 166 for making decision pixel wise categorization from a previous artifact mask into a smart artifact masking. Further, in operation 15, the mask classifier 166 generates the output binary mask based on the multiple inputs received. The output binary mask indicates the wanted and the unwanted portions of the artifact such as shadow in the input image. In operations 16 and 17, the output binary mask is overlaid on the input image to obtain the final output image. In other words, the unwanted artifact indicated by the white portion of the binary mask is removed from the input image and the unwanted artifact is replaced by corresponding part of the output from the refinement generator 164f. The wanted artifact indicated by the black portion of the binary mask is not removed from the input image, and the wanted artifact maintains without being replaced by the output from the refinement generator 164f. In the final output image, the portion of the shadow which is blocking the clear appearance of the face of the subject is removed and the portion of the shadow in the neck portion of the subject which is providing a depth to the image is retained. The mask classifier 166 is a neural network model which is trained with multiple images to be able to decide whether the artifact is wanted or unwanted.

Figure 7C:
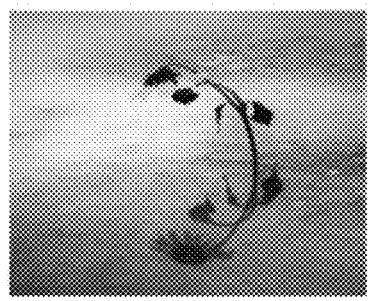
FIG. 7C are examples illustrating wanted and unwanted artifacts in the image, according to embodiments as disclosed herein.
Figure 7C:
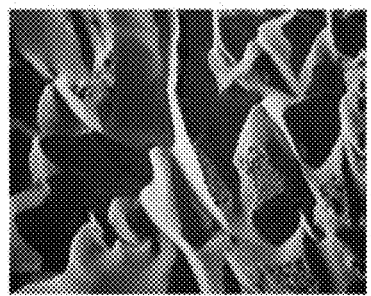
Figure 7C:
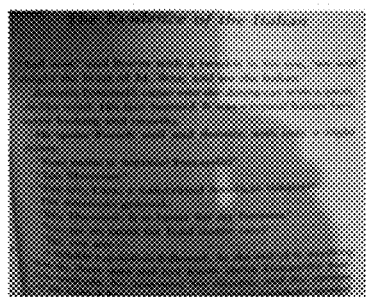
Figure 7C:
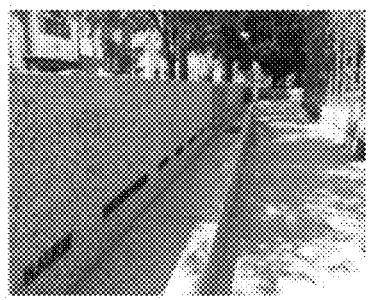

FIG. 7C are examples illustrating wanted and unwanted artifacts in the image, according to embodiments as disclosed herein.

Shadows may help to draw attention to a specific point in the composition. They can reveal form or hide features that may be better left unseen. They can also be used to add a hint of drama, emotion, interest, or mystery to the image. Further, the shadows can emphasize light and draw attention to highlights in the image. Thus, according to the image, the shadow need to be removed from the image, and sometime the shadow need to be maintained in the image.

Referring to FIG. 7C, multiple images with artifacts are used to train the mask classifier 166 to determine the wanted and the unwanted artifacts. The artifact in image (a) of FIG. 7C is a glare part (a lower part of the image showing a reflected flower) which completes the image and also adds aesthetic value to the image. Therefore, the glare in the image is considered as a wanted artifact. The artifact in image (b) of FIG. 7C is shadows associated with each sand dune which is providing depth information and also aesthetic value to the image. Therefore, the shadows in the image are considered as wanted artifacts. In general, the shadows which provide depth meaning in landscape images the removal of which leads to loss of 3-D nature of the image, the shadows which are captured as the main subject in the image, the shadows which enhances the emotions and bring out true tone of the image, monochrome image shadows which provide a contrast and thus enhance the meaning and value of the image are all considered as the wanted shadows.

The artifact in image (c) of FIG. 7C is a shadow of the electronic device 100 on a book due to a wrong angle of capture of the image. The shadow on the book or any text reading hinders the OCR reading as well as recovery and authentication of any document. The artifact in image (d) of FIG. 7C is a shadow of the multiple trees on a road. The distorted unstructured shadows in the image decrease the visibility and appeal of a good subject image. Similarly the shadows which block the main subject, the shadows which block facial expression and features of the image are all considered as the unwanted shadows.

Further, the proposed method can be used to suggest various direction and other camera effects values (as white balance, exposure, ISO etc.). The shadows are formed when there is a blockage in the path of light. So the direction of progression of shadow indicates from which direction light is coming and suggestions can be displayed to the user as to move to which direction so as to prevent shadow from ruining the image. The higher the intensity of light is, the darker the shadow is, or vice versa. So by evaluating the shadow, the electronic device 100 can automatically suggest various camera controls such as white balance, ISO, exposure etc. so as to give a naturally enhanced and meaningful photo.

Figure 8A:
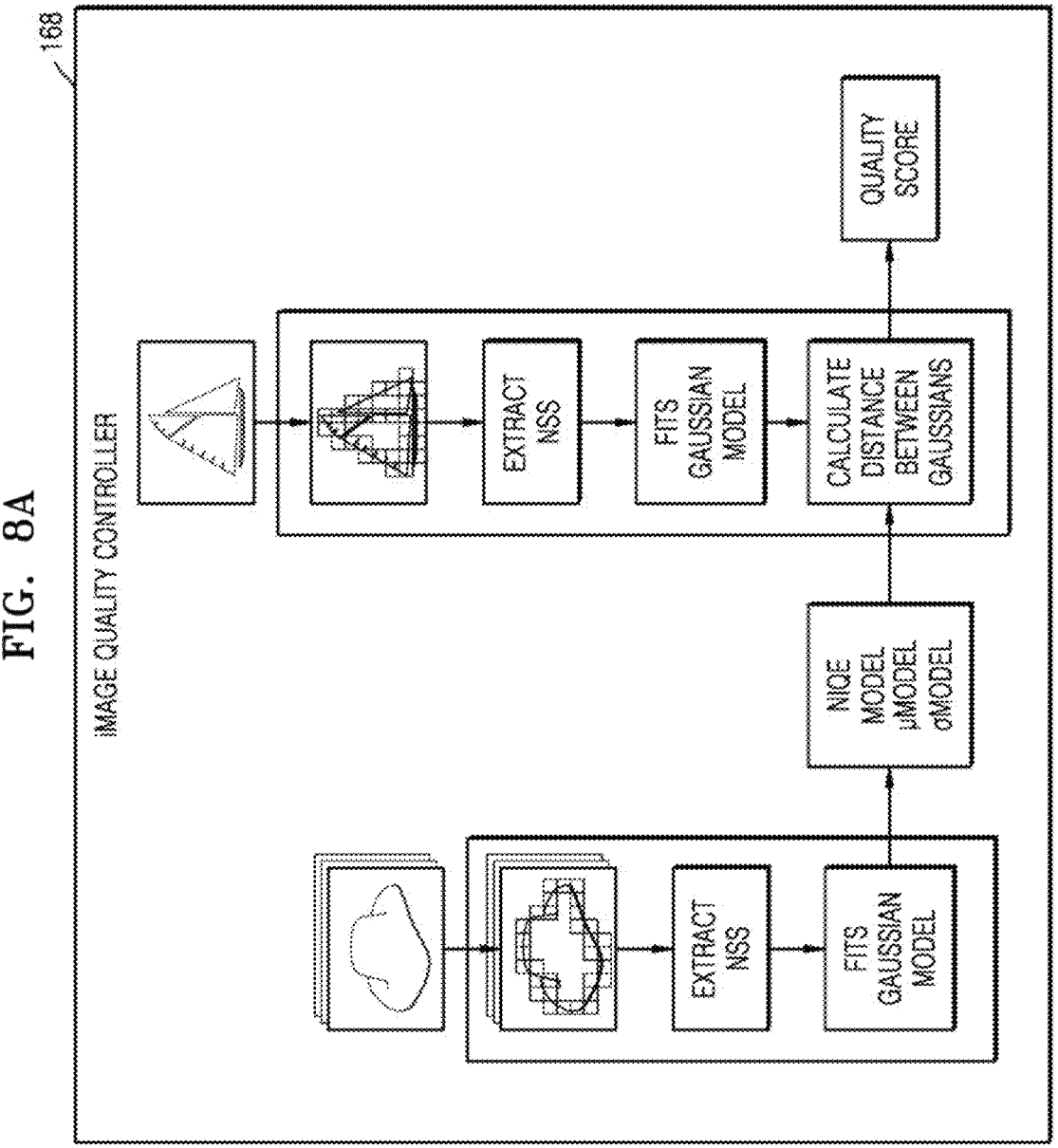
FIG. 8A illustrates an architecture of an image quality controller to determine the image with a best quality after overlaying a binary mask on the input image, according to embodiments as disclosed herein.

FIG. 8A illustrates an architecture of the image quality controller 168 for determining the image with the best quality after overlaying the binary mask on the input image, according to the embodiments as disclosed herein.

Referring to FIG. 8A, the architecture of the image quality controller 168 is provided. The image quality controller 168 is a Naturalness Image Quality Evaluator (NIQE) which measures the quality of the images with arbitrary distortion. The image quality controller 168 uses a trained model to compute a quality score. The model is trained using identical predictable statistical features, called natural scene statistics (NSS).

The NSS are based on normalized luminance coefficients in spatial domain and are modelled as a multidimensional Gaussian distribution. There can be distortions which appear as perturbations to the Gaussian distribution.

The quality score of each of the images is provided using the equation as:

$$D(v_1, v_2, \Sigma_1, \Sigma_2) = \sqrt{\left((v_1 - v_2)^T \left(\frac{\Sigma_1 - \Sigma_2}{2}\right)^{-1} (v_1 - v_2)\right)} \quad (7)$$

where v1, v2 and Σ1, Σ2 are the mean vectors and covariance matrices of the natural Gaussian model and the distorted image's Gaussian model. Therefore, unlike the conventional methods and system, in the proposed method the electronic device 100 not just intelligently applies the binary mask based on the decision of wanted and unwanted artifact but also selects the best image based on the gamma correction.

Figure 8B:
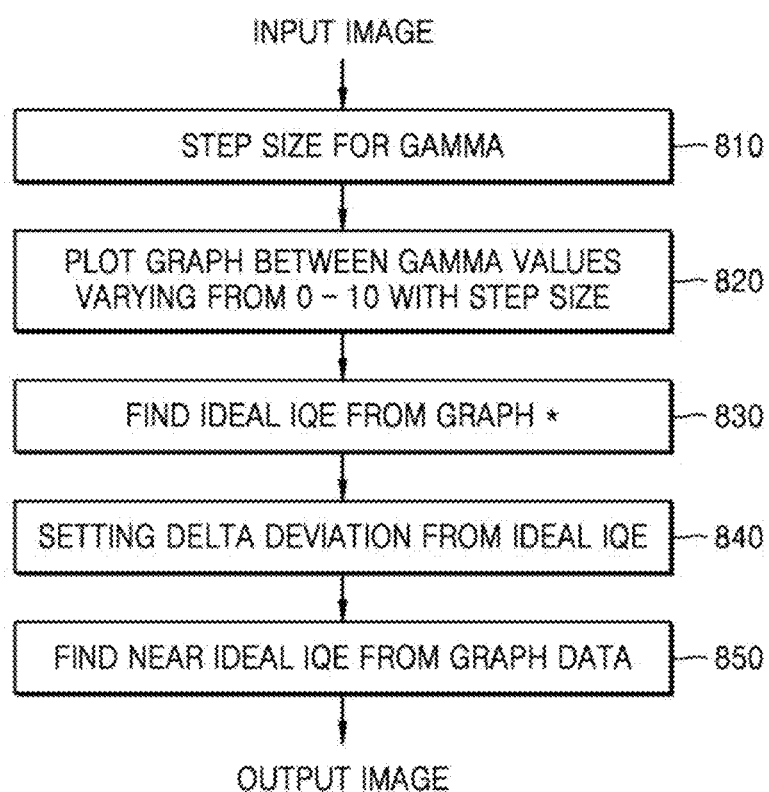
FIG. 8B is a flow chart illustrating a method for determining the image with the best quality overlaying the binary mask on the input image, according to embodiments as disclosed herein.

FIG. 8B is a flow chart illustrating the method for determining the image with the best quality after overlaying the binary mask on the input image, according to the embodiments as disclosed herein.

Referring to FIG. 8B, in operation 810, the electronic device 100 receives the input image(s) to which the binary mask is applied and determines a step size for performing gamma correction. Further, in operation 820, the electronic device 100 plots the graph between the Gamma values varying between 0-10 with the determined step size. In operation 830, the electronic device 100 finds the ideal Image Quality Evaluator (IQE) from the graph plot (explained in FIG. 8D). In operation 840, the electronic device 100 determines and sets the delta deviation from the ideal IQE. In operation 850, the electronic device 100 determines a near ideal IQE from the graph plot.

FIG. 8C is a table illustrating NIQE against Gamma for obtaining various images by varying the gamma value, according to the embodiments as disclosed herein.

Figure 8D:
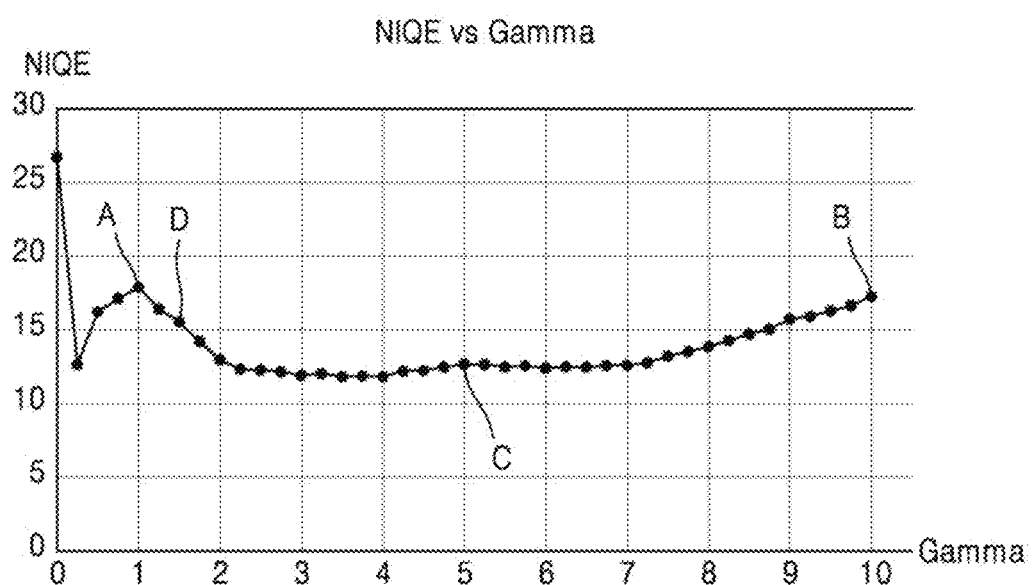
FIG. 8D is a graph plot illustrating of NIQE against Gamma for obtaining various images by varying a gamma value, according to embodiments as disclosed herein.

FIG. 8D is a graph plot illustrating NIQE against Gamma for obtaining various images by varying the gamma value, according to the embodiments as disclosed herein.

Referring to FIGS. 8C and 8D, the electronic device 100 determines the graph plot by generating the images with variable Gamma values. For each image with a specific gamma value, the corresponding Natural Image Quality Evaluator (NIQE) value is determined as shown in FIG. 8C. Further, the lowest value of the NIQE in a stable region of the graph plot is determined and the image including that gamma value is selected as the best quality image.

From FIG. 8D, the gamma value of 1.5 is determined to be the most stable and hence the image associated with the gamma value 1.5 is chosen as the best quality image after the application of the binary mask. The procedure for determining the stable point gamma value is explained in FIG. 8E and the best quality image obtained is provided in FIG. 8F.

Figure 8E:
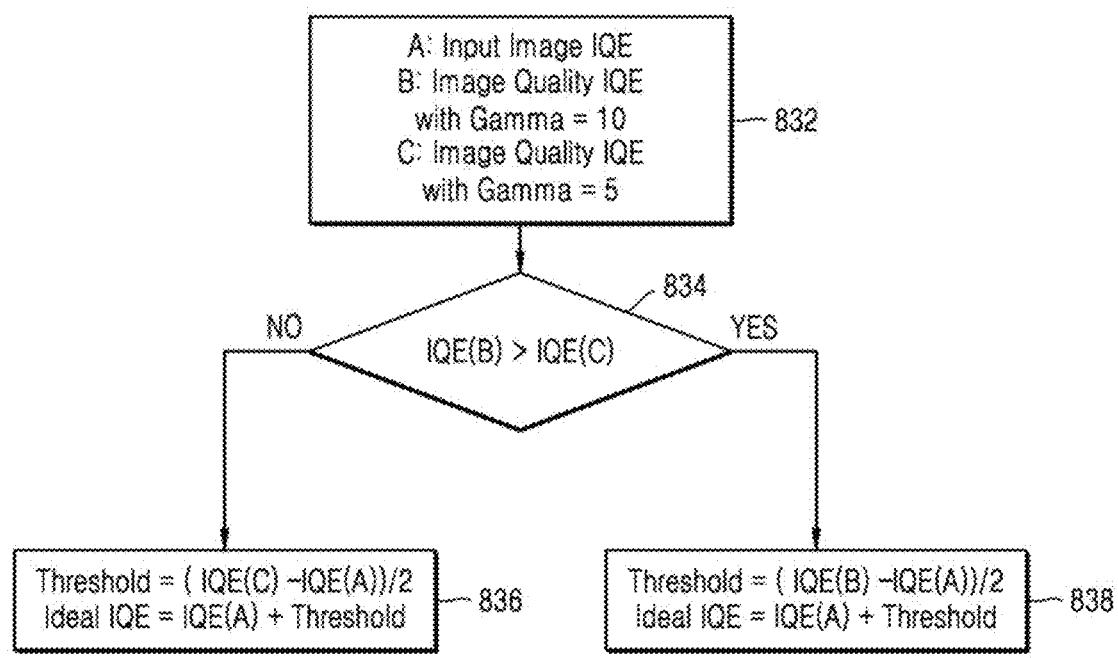
FIG. 8E is a flow chart illustrating a method for determining an ideal IQE for obtaining the best quality from the NIQE against the Gamma plot, according to embodiments as disclosed herein.

FIG. 8E is a flow chart illustrating the method for determining the ideal IQE for obtaining the best quality from the NIQE against Gamma plot, according to the embodiments as disclosed herein.

Referring to FIG. 8E, in conjunction with FIGS. 8C and 8D, in operation 832, the electronic device 100 obtains three (3) image IQEs i.e., the input image IQE (IQE of point A in FIGS. 8C and 8D), a first image quality IQE with Gamma value 10 (IQE of point B in FIGS. 8C and 8D) and a second image quality IQE with Gamma value 5 (IQE of point C in FIGS. 8C and 8D).

In operation 834, the electronic device 100 determines whether the first image quality IQE is greater than the second image quality IQE. In operation 836, in response to determining that the first image quality IQE (IQE(B)) is greater than the second image quality IQE (IQE(C)), the electronic device 100 computes a threshold calculated by finding the point with lower NIQE between Max Gamma (gamma=10) and half of max Gamma, i.e. gamma=5 as:

$$\text{Threshold}=(IQE(C)-IQE(A))/2$$

Further, the ideal NIQE is calculated by subtracting initial NIQE by half difference between compared above result and initial NIQE as:

$$\text{Ideal } IQE=IQE(A)+\text{Threshold} \quad (8)$$

In operation 838, in response to determining that the first image quality IQE is not greater than the second image quality IQE, the electronic device 100 computes a threshold as:

$$\text{Threshold}=(IQE(B)-IQE(A))/2 \quad (9)$$

$$\text{Ideal } IQE=IQE(A)+\text{Threshold} \quad (10)$$

Therefore, in FIG. 8D, the electronic device 100 determines the point with lower NIQE between Max Gamma and half of max Gamma. Ideal NIQE is 17.87−(17.87−12.65)/2=15.26. Searching ideal NIQE with absolute difference with delta as |15.54−15.26|<0.5 and the Stable Point D is obtained as Gamma=1.5

Figure 8F:
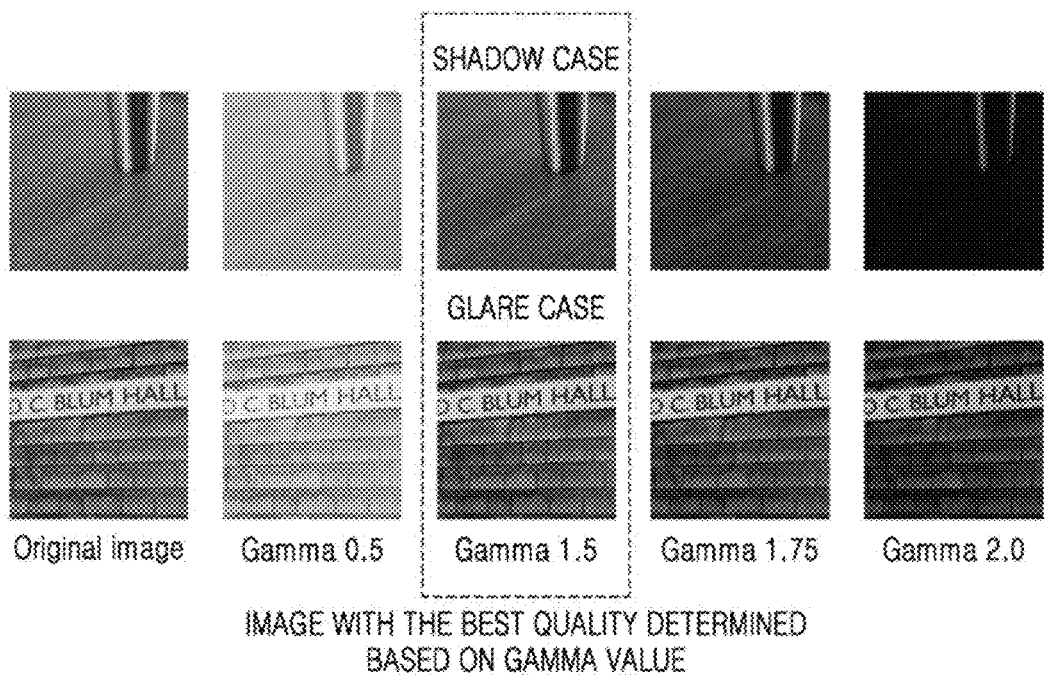
FIG. 8F illustrates a scenario of color compensation using gamma-correction in the input image including the artifact, according to embodiments as disclosed herein.

FIG. 8F illustrates a scenario of color compensation using gamma-correction in the input image including the artifact, according to embodiments as disclosed herein.

Referring to FIG. 8F, in conjunction with FIG. 8E, the NIQE versus the Gamma comparison provides 1.5 as the best gamma-correction value for the input image. The multiple output images obtained by varying the gamma-correction values is provided and the best image is found at Gamma-correction value=1.5 in both the shadow case and the glare case.

Figure 9A:
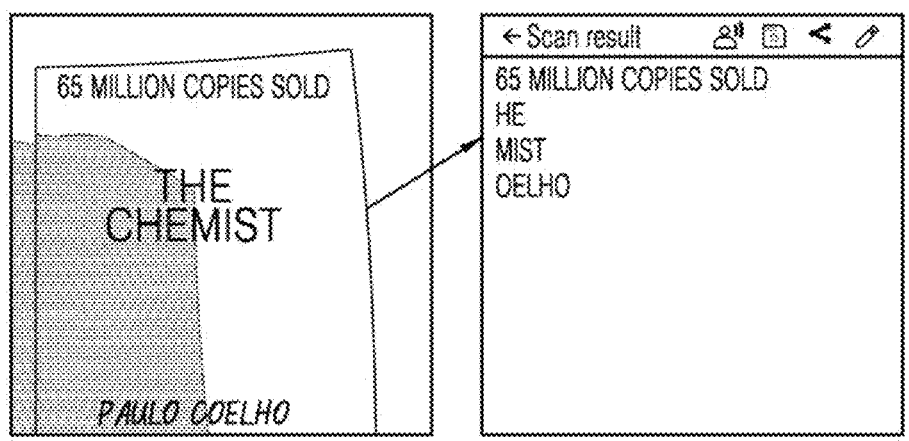
FIG. 9A is an example illustrating a scenario of optical character, according to the prior art.

FIG. 9A is an example illustrating a scenario of optical character recognition in the related art.

OCR is commonly used for aiding blind people in reading, to preserve books and scripts in digital format, for e-signing and processing of digital documents. Generally, with scanned images, the users face problems with various light conditions and thus artifacts in the scanned images. Referring to FIG. 9A the shadow present in the image blocks the characters and thus OCR provides incomplete and wrong results which is not acceptable. Therefore, the user needs to perform the tedious task of editing the image for satisfying digital document requirements.

Figure 9B:
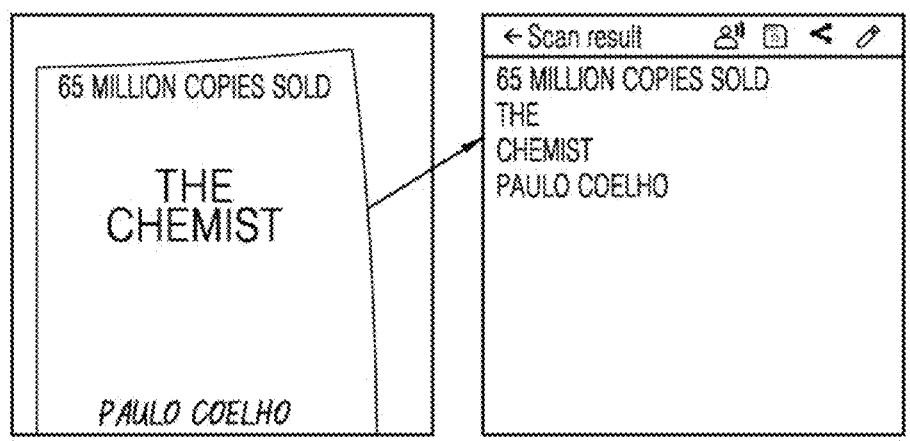
FIG. 9B is an example illustrating a scenario of the OCR, according to embodiments as disclosed herein.

FIG. 9B is an example illustrating a scenario of the OCR by the electronic device 100, according to embodiments as disclosed herein.

Referring to FIG. 9B, the electronic device 100 captures the clear and sharp image which provides the complete, correct results which can be used for digital documentation.

Therefore, using the proposed method the electronic device 100 removes the shadow from the input image and then applies the OCR to obtain better results with very less editing required.

FIG. 10A is an example illustrating a scenario of shadow captured along a black background in the related art.

Referring to FIG. 10A, an image of an object is captured and is placed along a black background. In images 1, 2 and 3, the shadow along the black background is still seen and is not removed from the images. Further, the shadow along the black background reduces the focus on the main object of the image therefore distorting the user experience.

Figure 10B:
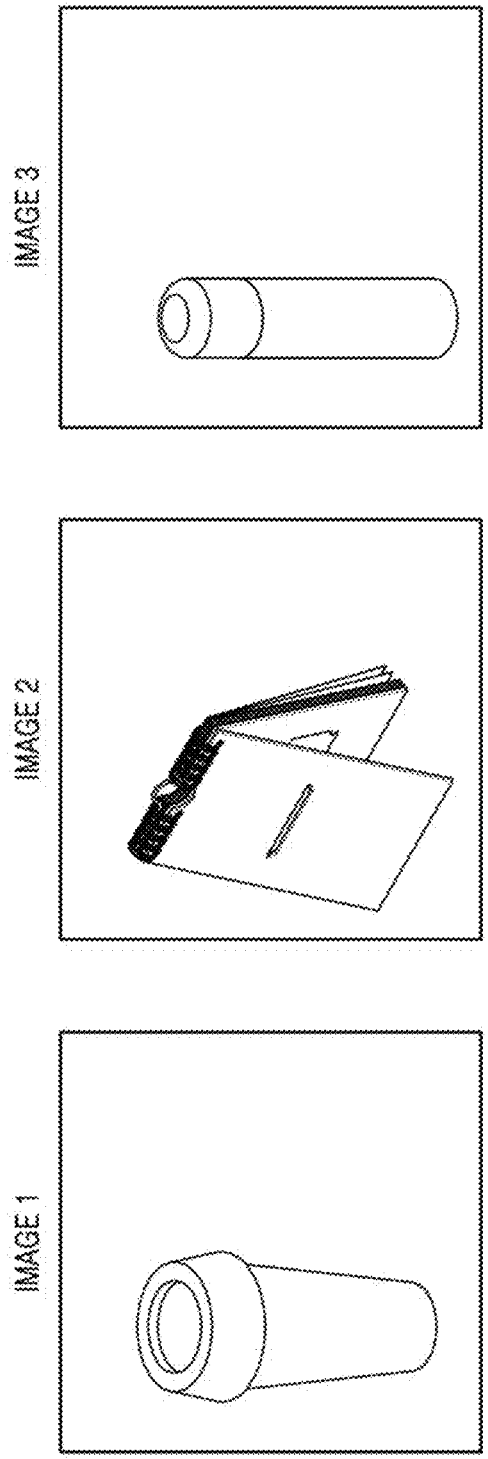
FIG. 10B is an example illustrating a scenario of shadow along the black background, according to embodiments as disclosed herein.

FIG. 10B is an example illustrating a scenario of shadow along a black background captured by the electronic device 100, according to embodiments as disclosed herein.

Referring to FIG. 10A, in conjunction with FIG. 10B, unlike the related methods and systems, the electronic device 100 according to embodiments detects the shadow along the black background and intelligently determines whether the shadow is wanted or unwanted. In the example case, since the shadow along the black background is not adding any value to images 1, 2 and 3, the shadow is classified as unwanted and removed. Therefore, the electronic device 100 according to embodiments is able to differentiate and manage the artifact even along black/dark backgrounds where the identification and differentiation of the artifact may not be possible or inefficient in traditional approaches.

Figure 10C:
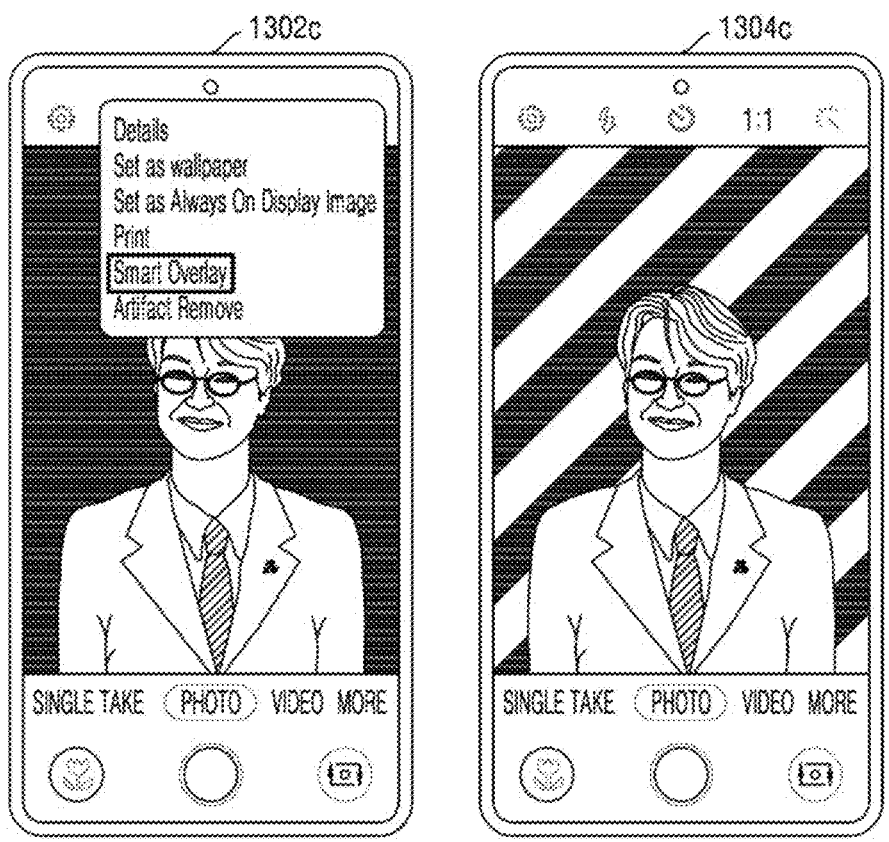
FIG. 10C is an example illustrating a scenario of smart overlay of the artifact by the electronic device, according to embodiments as disclosed herein.

FIG. 10C is an example illustrating a scenario of smart overlay of the artifact by the electronic device 100, according to the embodiments as disclosed herein.

Referring to FIG. 10C, consider that the user is trying to capture the image in a live-preview mode of the electronic device 100. In the live-preview mode, the electronic device 100 provides an option of "smart overlay". The smart overlay refers to the binary mask stored in the electronic device 100 which the user may choose to apply to any of the images. Further, in step 1302c the user manually selects the "smart overlay" option along a drop-down and the binary mask is automatically applied to the image while the image is captured.

Figure 10D:
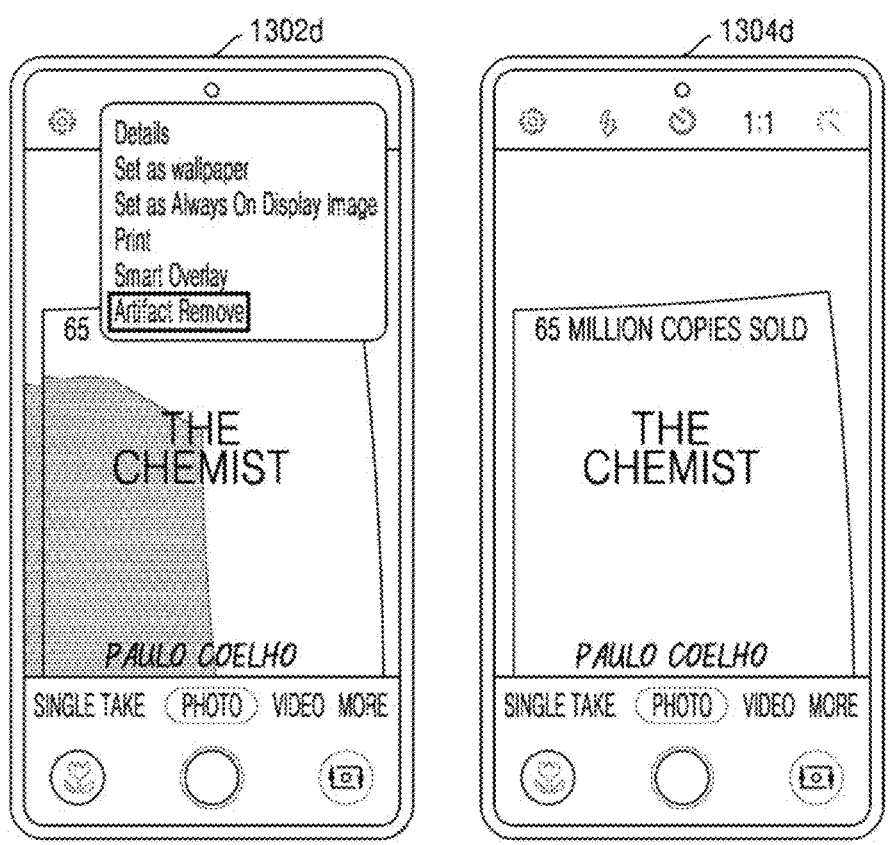
FIG. 10D is an example illustrating a scenario of artifact removal in a live-preview mode of the electronic device, according to embodiments as disclosed herein.

FIG. 10D is an example illustrating a scenario of artifact removal in live-preview mode of the electronic device 100, according to the embodiments as disclosed herein.

Referring to FIG. 10D, the electronic device 100 allows the user to choose whether to capture the image in the live-preview mode with or without the shadow. In the example, in operation 1302d, the electronic device 100 provides the live-preview mode image of a book where its shadow is covering a portion of the book cover. The user then selects the "Artifact remove" option from the drop-down then the electronic device 100 captures the image of the book by removing the shadow.

Figure 10E:
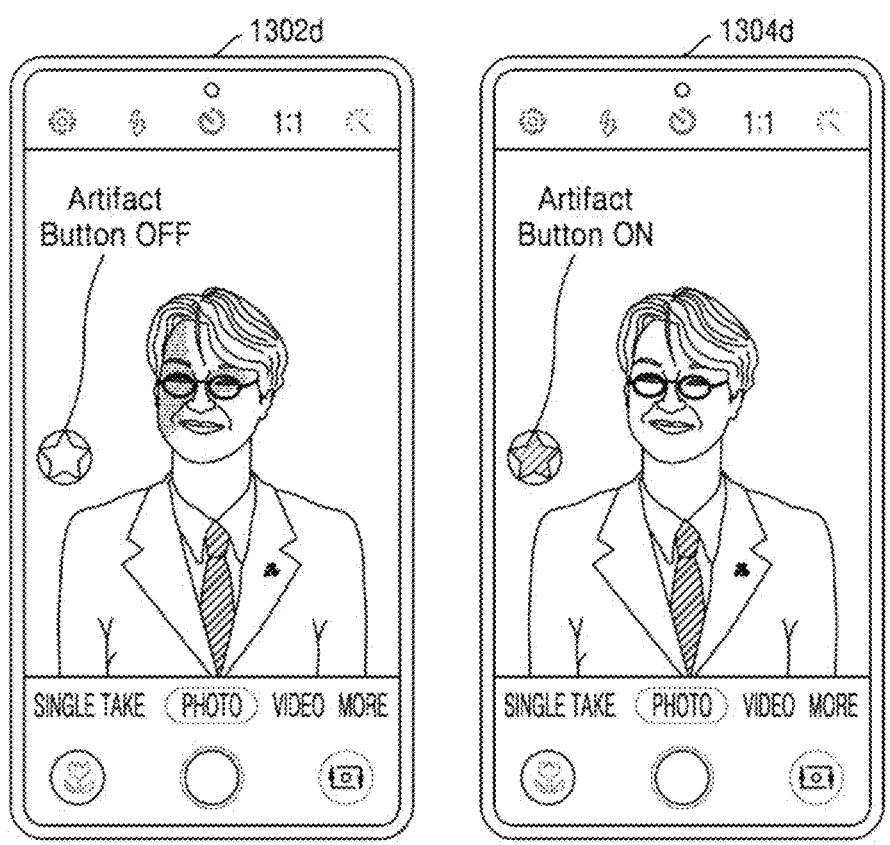
FIG. 10E is an example illustrating an artifact managing active element in the live-preview mode of electronic device, according to embodiments as disclosed herein.

FIG. 10E is an example illustrating an artifact managing active element in the live-preview mode of the electronic device 100, according to the embodiments as disclosed herein.

Referring to FIG. 10E, the electronic device 100 provides the artifact managing active element which can be for example an icon, a button, etc. The user needs to manually activate the artifact managing active element to enable the artifact management as provided by the proposed method. In operation 1302e, the user has not activated the artifact managing active element and hence the image preview includes the shadow on the face of the user. In operation 1304e, the user has enabled the artifact managing active element and hence the electronic device 100 determines that the shadow as the unwanted artifact and removes the shadow while capturing the image.

Figure 10F:
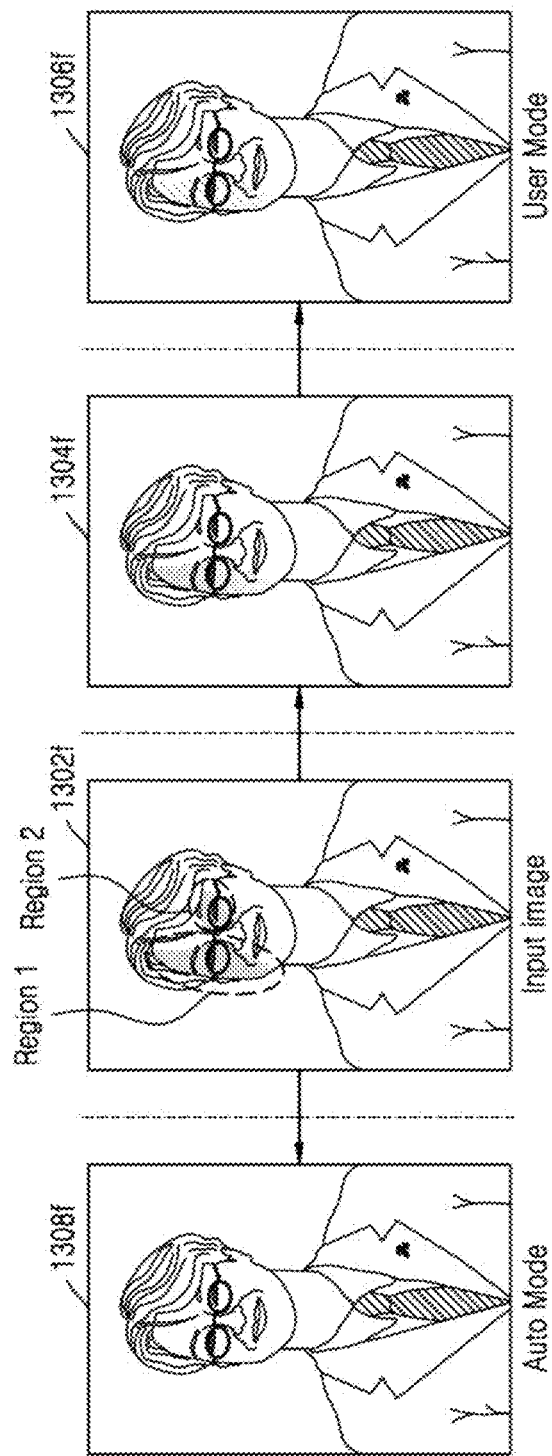
FIG. 10F is an example illustrating example modes of managing the artifact by the electronic device, according to embodiments as disclosed herein.

FIG. 10F is an example illustrating example modes of managing the artifact by the electronic device 100, according to embodiments as disclosed herein.

Referring to FIG. 10F, consider the input image as shown in operation 1302f which includes shadow on the face of the user in region 1 and region 2. Consider a user mode where the electronic device 100 allows the user to select the region of the shadow which is wanted and the region of the shadow which are unwanted. In operation 1304f, the electronic device 100 allows the user to retain the region 1 of the shadow and remove the region 2 of the shadow. In operation

1306f, the electronic device 100 allows the user to vary the opacity of the region 1 shadow, thereby allowing the user to further enhance the image.

Consider the auto-mode where the electronic device 100 automatically determines the region of the shadow which is wanted and the region of the shadow which are unwanted, and automatically applies the binary mask generated for the same. In operation 1308f, the electronic device 100 determines that the region 1 of the shadow and the region 2 of the shadow both are unwanted and hence both are removed.

Figure 11A:
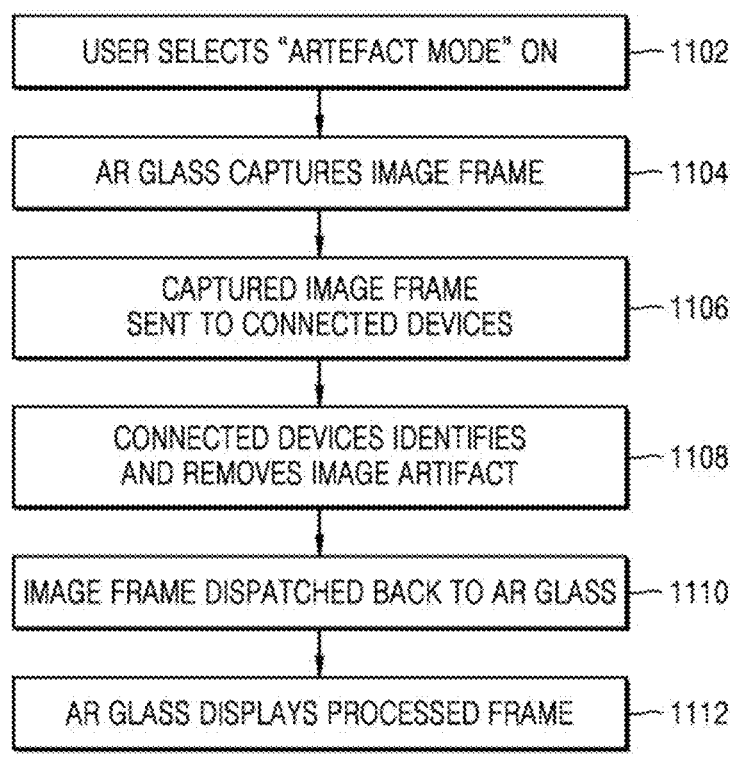
FIG. 11A is a flow chart illustrating a method for managing the artifact of the image by an electronic device, according to embodiments as disclosed herein.

FIG. 11A is a flow chart illustrating a method for managing the artifact of the image by the electronic device 100, according to the embodiments as disclosed herein.

Referring to FIG. 11A, the electronic device 100 may be an augmented reality (AR) device. In operation 1102, consider that the user is wearing the electronic device 100 and selects "Artifact Mode" ON. In operation 1104, the electronic device 100 captures the image frame and in operation 1106, the electronic device 100 sends the captured image frame to connected devices. Further, in operation 1108, the connected devices identify and remove the image artifact and in operation 1110, the image frame is resent to the electronic device 100. In operation 1112, the electronic device 100 displays the processed frame. Therefore, the proposed method can be executed by a third device which is not the one which capture the image frame.

Figure 11B:
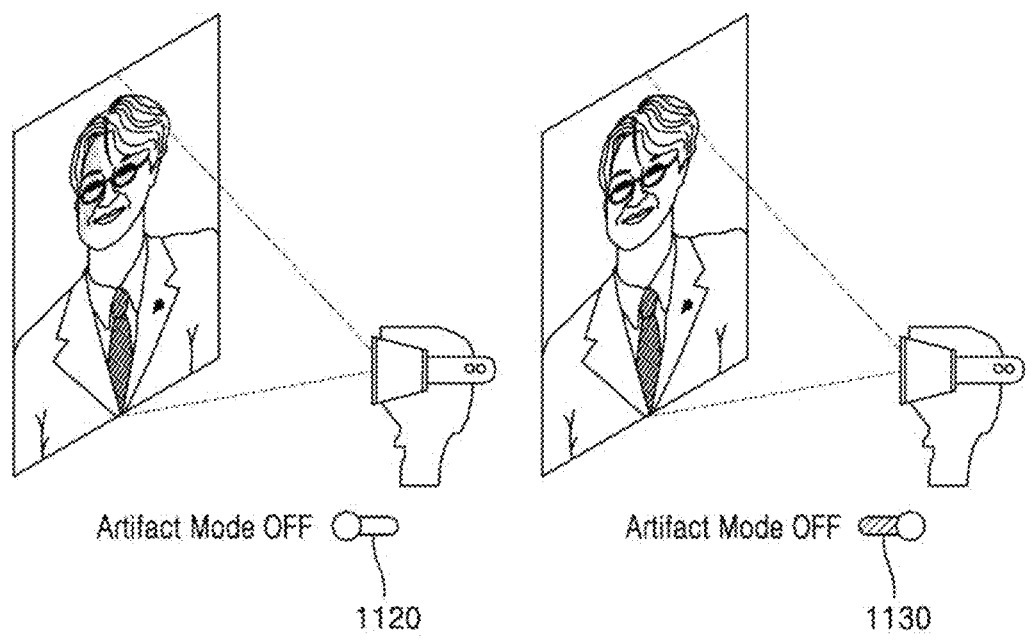
FIG. 11B is an example illustrating the management of the artifact of the image by the electronic device, according to embodiments as disclosed herein.

FIG. 11B is an example illustrating the management of the artifact of the image by the electronic device 100, according to the embodiments as disclosed herein.

Referring to FIG. 11B, in conjunction with FIG. 11A, in operation 1120 the user has not activated the artifact mode which is available in the electronic device 100 and hence the image frame captured is displayed as it is with the shadow along the face of the subject captured in the image frame. In operation 1130, the user activates the artifact mode in the electronic device 100 and hence the shadow along the face of the subject is automatically and intelligently removed and a clearer image is displayed. Therefore, the proposed method is executed in real-time to obtain images without the artifact.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art. While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing image data, the method comprising:
   receiving an input image;
   extracting a plurality of features from the input image, wherein the plurality of features comprise a texture of the input image, a color composition of the input image, and edges in the input image;
   determining at least one region of interest (RoI) in the input image including at least one artifact based on the plurality of features;
   generating at least one intermediate output image by removing the at least one artifact from the input image, using at least one of a first generative adversarial image generated by removing darkest regions of the at least one artifact in the input image, a second GAN image generated by removing at least one of color continuous regions or texture continuous regions of the at least one artifact in the input image, or a third GAN image generated by removing lightest regions of the at least one artifact and adding white patch regions to the at least one artifact in the input image;
   generating a binary mask directly from the at least one intermediate output image, the input image, the edges in the input image, and edges in the at least one intermediate output image;
   categorizing the at least one artifact into a first artifact category or a second artifact category, based on the binary mask; and
   obtaining a final output image by processing the input image based on a category of the at least one artifact corresponding to the first artifact category or the second artifact category.

2. The method as claimed in claim 1, further comprising:
   generating a plurality of versions of the at least one intermediate output image by varying a gamma value associated with the final output image;
   determining a naturalness image quality evaluator (NIQE) value for each of the plurality of versions of the at least one intermediate output image; and
   displaying, as the final output image, one of the plurality of versions of the at least one intermediate output image, which has a least NIQE value, among the NIQE values for the plurality of versions of the at least one intermediate output image.

3. The method as claimed in claim 1, wherein the extracting the plurality of features from the input image comprises:
   extracting the texture, the color composition, and the edges from the input image based on Otsu thresholding, Gaussian Blur and edge detection, respectively.

4. The method as claimed in claim 1, wherein a plurality of GANs are used to generate the least one the plurality of GANs comprise a negative generator, an artifact generator, a division generator, a negative discriminator, a division discriminator, a refinement generator and a refinement discriminator.

5. The method as claimed in claim 4, wherein the generating the at least one intermediate output image comprises:
   determining a set of loss values for each of the plurality of GANs;
   generating the first GAN image using the negative generator;
   generating the second GAN image using the artifact generator;
   generating the third GAN image using the division generator; and
   generating the at least one intermediate output image without the at least one artifact using at least one of the first GAN image, the second GAN image and the third GAN image.

6. The method as claimed in claim 1, wherein the input image is a previous input image, and the method further comprises:
   receiving a new input image; and
   overlaying the binary mask obtained for the previous input image on the new input image.

7. The method as claimed in claim 1, wherein the at least one artifact is a shadow or a glare.

8. The method as claimed in claim 1, wherein the first artifact category corresponds to a wanted artifact, and the second artifact category corresponds to an unwanted artifact.

9. An electronic device for processing image data, the electronic device comprising:
a memory storing instructions; and
a processor configured to execute the instructions to:
receive an input image;
extract a plurality of features from the input image, wherein the plurality of features comprise a texture of the input image, a color composition of the input image and edges in the input image;
determine a region of interest (RoI) in the input image comprising at least one artifact based on the plurality of features;
generate an at least one intermediate output image by removing the at least one artifact from the input image, using at least one of a first generative adversarial image generated by removing darkest regions of the at least one artifact in the input image, a second GAN image generated by removing at least one of color continuous regions or texture continuous regions of the at least one artifact in the input image, or a third GAN image generated by removing lightest regions of the at least one artifact and adding white patch regions to the at least one artifact in the input image;
generate a binary mask directly from the at least one intermediate output image, the input image, the edges in the input image and edges in the at least one intermediate output image;
categorize the at least one artifact into a first artifact category or a second artifact category, based on the binary mask; and
obtain a final output image from the input image based on a category of the at least one artifact that corresponds to the first artifact category or the second artifact category.

10. The electronic device as claimed in claim 9, wherein the processor is further configured to:
generate a plurality of versions of the at least one intermediate output image by varying a gamma value associated with the final output image;
determine a naturalness image quality evaluator (NIQE) value for each of the plurality of versions of the at least one intermediate output image; and
display a version of the final output image with a least NIQE value, among the NIQE values for the plurality of versions.

11. The electronic device as claimed in claim 9, wherein the processor is further configured to:
extract the texture, the color composition, and the edges based on Otsu thresholding, Gaussian Blur, and edge detection, respectively.

12. The electronic device as claimed in claim 9, wherein a plurality of GANs are used to generate the least the plurality of GANs comprise a negative generator, an artifact generator, a division generator, a negative discriminator, a division discriminator, a refinement generator, and a refinement discriminator.

13. The electronic device as claimed in claim 12, wherein the processor is further configured to:
determine a set of loss values for each of the plurality of GANs;
generate the first GAN image using the negative generator;
generate the second GAN image using the artifact generator;
generate the third GAN image using the division generator; and
generate the at least one intermediate output image without the at least one artifact using at least one of the first GAN image, the second GAN image and the third GAN image.

14. The electronic device as claimed in claim 9, wherein the input image is a previous input image, and the processor is further configured to:
receive a new input image; and
overlay the binary mask obtained for the previous input image on the new input image.

15. The electronic device as claimed in claim 9, wherein the at least one artifact is a shadow or a glare.

16. The electronic device as claimed in claim 9, wherein the first artifact category corresponds to a wanted artifact, and the second artifact category corresponds to an unwanted artifact.

17. A non-transitory computer-readable storage medium storing a program that is executable by one or more processors to perform a method of processing image data, the method comprising:
obtaining an input image;
identifying types of artifacts included in the input image, wherein the types of artifacts comprise a darkest region of a shadow in the input image, a continuous color and texture region of the shadow, and a lightest region of the shadow;
generating a plurality of intermediate output images in which the artifacts by removing the darkest region of the shadow from the input image to generate a first intermediate output image, removing the continuous color and texture region of the shadow from the input image to generate a second intermediate output image, and removing the lightest region of the shadow from the input image to generate a third intermediate output image;
generating a binary mask based on the plurality of intermediate output images and the input image; and
applying the binary mask to the input image to selectively keep or remove the artifacts and to obtain a final output image in which at least one of the artifacts remains and another at least one of the artifacts is removed.

18. The non-transitory computer-readable storage medium of claim 17, wherein the removing the lightest region of the shadow to generate the third intermediate output image comprises:
adding a white patch to the lightest region of the shadow after removing the lightest region of the shadow.

19. The non-transitory computer-readable storage medium of claim 17, wherein the method further comprises combining the first intermediate output image, the second intermediate output image, and the third intermediate output image, as a combined intermediate image of the plurality of intermediate output images; and
wherein the generating the binary mask comprises generating the binary mask based on the combined intermediate image.

* * * * *